(12) United States Patent
Sheth et al.

(10) Patent No.: US 11,321,465 B2
(45) Date of Patent: May 3, 2022

(54) NETWORK SECURITY BY INTEGRATING MUTUAL ATTESTATION

(71) Applicant: Cisco Technology, Inc., San Jose, CA (US)

(72) Inventors: Sujal Sheth, Gujarat (IN); Shwetha Subray Bhandari, Bangalore (IN); Eric Voit, Bethesda, MD (US); William F. Sulzen, Apex, NC (US); Frank Brockners, Cologne (DE)

(73) Assignee: CISCO TECHNOLOGY, INC., San Jose, CA (US)

( * ) Notice: Subject to any disclaimer, the term of this patent is extended or adjusted under 35 U.S.C. 154(b) by 154 days.

(21) Appl. No.: 16/752,488

(22) Filed: Jan. 24, 2020

(65) Prior Publication Data

US 2020/0320199 A1  Oct. 8, 2020

Related U.S. Application Data

(60) Provisional application No. 62/830,178, filed on Apr. 5, 2019, provisional application No. 62/830,181, filed on Apr. 5, 2019, provisional application No. 62/829,570, filed on Apr. 4, 2019.

(51) Int. Cl.
  *G06F 21/57* (2013.01)
  *H04L 9/32* (2006.01)
  *H04L 9/08* (2006.01)

(52) U.S. Cl.
  CPC ............ *G06F 21/57* (2013.01); *H04L 9/0869* (2013.01); *H04L 9/3213* (2013.01)

(58) Field of Classification Search
  CPC ..... G06F 21/57; G06F 21/606; H04L 9/0869; H04L 9/3213; H04L 63/0823; H04L 9/3271; H04L 9/3234
  USPC ..... 726/726, 2, 16, 27, 28, 29; 713/168, 164
  See application file for complete search history.

(56) References Cited

U.S. PATENT DOCUMENTS

2016/0381007 A1* 12/2016 Berger .................... H04L 63/06
  726/7

FOREIGN PATENT DOCUMENTS

WO   WO-2014038926 A1 *  3/2014  ............. G06F 21/57

* cited by examiner

*Primary Examiner* — Izunna Okeke
(74) *Attorney, Agent, or Firm* — Polsinelli PC

(57) ABSTRACT

Technologies for attestation techniques, systems, and methods to confirm the integrity of a device for establishing and/or maintaining a trustworthy encrypted network session. An example method can include sending, via a server and using a cryptographic security protocol, a message associated with establishing an encrypted network session; receiving a response from a client device; identifying a level of trust of the client device based on the response; determining whether to perform a next step in the cryptographic security protocol based on the level of trust, wherein the cryptographic security protocol comprises at least one of a Secure Shell (SSH) protocol, a Transport Layer Security (TLS) protocol, a Secure Sockets Layer (SSL) protocol, and an Internet Protocol Security (IPsec) protocol.

20 Claims, 13 Drawing Sheets

| 0 | 4 | 8 | 12 | 16 | 20 | 24 | 28 | 32 |
|---|---|---|----|----|----|----|----|----|
| Next Header | | Attestation data length | | Attestation Data | | | | |

FIG. 6A

| Protocol | | Next Header (TCP) Attestation Header | TCP Header | TCP Data | Next Header (Attestation Header) | | |
|---|---|---|---|---|---|---|---|
| IPv4 Header | ESP Header | Encrypted Data (Original IP datagram) | | | ESP Trailer | ESP Auth Data | |

FIG. 6B

NETWORK SECURITY BY INTEGRATING MUTUAL ATTESTATION

CROSS-REFERENCE TO RELATED APPLICATIONS

This application claims the benefit of, and priority to, U.S. Provisional Patent Application No. 62/830,178, filed on Apr. 5, 2019, entitled "ENSURING TRUSTED CLIENT-SERVER RELATIONSHIPS FOR SECURE SHELL", U.S. Provisional Patent Application No. 62/829,570, filed on Apr. 4, 2019, entitled "IMPROVING NETWORK SECURITY BY INTEGRATING SECURE SOCKETS LAYER/TRANSPORT LAYER SECURITY AND MUTUAL ATTESTATION", and U.S. Provisional Patent Application No. 62/830,181, filed on Apr. 5, 2019, entitled "VERIFYING IPSEC TUNNEL ENDPOINTS USING ATTESTATION", the contents of which are incorporated herein by reference in their entirety.

TECHNICAL FIELD

The present disclosure generally relates to the field of computer networking, and more particularly to assessing reliability and trustworthiness of devices that intend to peer over sensitive networks.

BACKGROUND

Trustworthiness of a given device operating within a network may degrade from the time of its initial configuration. Active measurements may be needed to validate that a device is equivalently trustworthy to the time of its initial deployment. In some cases, certain verification checks can be implemented to attempt to verify the integrity of a device in order to reduce or mitigate the harm caused by the device becoming compromised. For example, an integrity verification application can check a device's memory to validate the integrity of the device. When errors are found during the check, the integrity verification application can implement steps to return the device to a trusted state.

However, such verification checks are expensive and unreliable, often inaccurately assuming that a device is likely to be in a normal or trusted state soon after being validated and less likely to be in a normal state just before such validation.

BRIEF DESCRIPTION OF THE FIGURES

To provide a more complete understanding of the present disclosure and features and advantages thereof, reference is made to the following description, taken in conjunction with the accompanying drawings, to which:

FIG. 6A illustrates an example attestation header for an IPSec extension for attestation in accordance with some examples;

FIG. 6B illustrates example encrypted integrity data for an IPSec extension for attestation in accordance with some examples;

DETAILED DESCRIPTION

Figure 1:
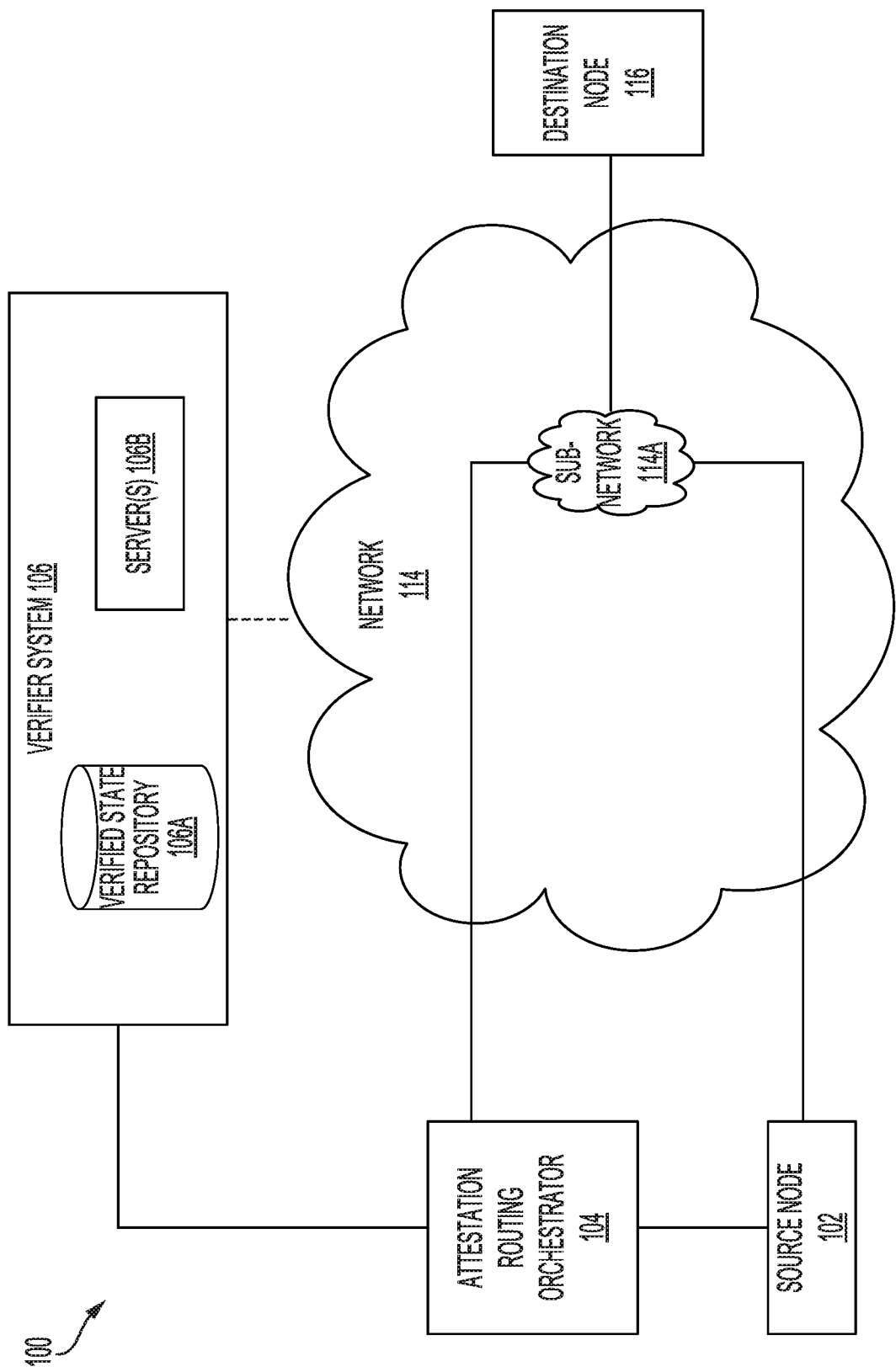
FIGS. 1, 2, and 3 illustrate example networking environments in accordance with some examples.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

Disclosed herein are systems, methods and computer-readable storage media for applying attestation to various cryptographic security protocols. In some aspects, an example method can include: sending, via a server and using a cryptographic security protocol, a message associated with establishing an encrypted network session; receiving a response from a client device; identifying a level of trust of the client device based on the response; determining whether to perform a next step in the cryptographic security protocol based on the level of trust, wherein the cryptographic security protocol comprises at least one of a Secure Shell (SSH) protocol, a Transport Layer Security (TLS) protocol, a Secure Sockets Layer (SSL) proto-col, and an Internet Protocol Security (IPsec) protocol.

In some examples, the response can include metadata about the client device's proof of integrity provided by a trusted platform module crypto-processor based on an evaluation of the response, with respect to the identity of hardware and software components of a responding client device. The response may be evaluated based on logs maintained in a trusted storage of the client device, wherein the logs indicate a set of transactions that have occurred since a boot time of the client device and provides data regarding the client device's trustworthiness. The response may further include a proof of freshness based on signed data generated within a threshold period of time including a current time when the response is sent. The message may comprise a challenge to the freshness of any response, the challenge comprising a nonce that is passed through a trusted platform module crypto-processor associated with the client device to generate a signature based on the nonce, and wherein the response comprises the signature.

The response may further include a proof of freshness based on a token, wherein the server validates the token with respect to the proof of freshness based on a state of internal counters within a trusted platform module crypto-processor associated with the client device, and wherein the server hosts a directory of reference integrity values, known good reference values, and public keys published as certificates of other peer devices for validating the tokens. The response may further include integrity data including information about secure boots, logs on software changes made on the client device, software-version checksums for one or more processes, proof that the client device supports trusted storage for received data, or an integrity of one or more hardware components.

At least part of the integrity data may be continuously provided by the server while the encrypted network session is periodically alive, persistently alive, alive on demand, or alive on event, and wherein the encrypted network session is terminated when the server fails to provide the integrity data or the level of trust fails to indicate trustworthiness. The method may further include: receiving one or more responses from a set of client devices, the multiple responses comprising random numbers and each response containing an unpredictable, random number from the perspective of the server, wherein the random numbers from the multiple responses from the multiple client devices form a set of random numbers, wherein the set of random numbers is algorithmically combined into a single nonce, and wherein the single nonce is passed through a crypto-processor to generate a signature which at least includes that single nonce as well as information from within the crypto-processor which allows a determination of the level of trust. The set of random numbers may be combined algorithmically into a single nonce using a Bloom filter.

In some aspects, an example system can include one or more processors and a non-transitory computer-readable storage medium having stored therein instructions which, when executed by the one or more processors, cause the one or more processors to: send, via a server and using a cryptographic security protocol, a message associated with establishing an encrypted network session; receive a response from a client device; identify a level of trust of the client device based on the response; and determine whether to perform a next step in the cryptographic security protocol based on the level of trust. The server may validate the token with respect to the proof of freshness based on a state of internal counters within a trusted platform module crypto-processor associated with the client device, and wherein the server hosts a directory of reference integrity values, known good reference values, and public keys published as certificates of other peer devices for validating the tokens.

This overview is not intended to identify key or essential features of the claimed subject matter, nor is it intended to be used in isolation to determine the scope of the claimed subject matter. The subject matter should be understood by reference to appropriate portions of the entire specification of this patent application, any or all drawings, and each claim.

The foregoing, together with other features and embodiments, will become more apparent upon referring to the following specification, claims, and accompanying drawings.

Example Embodiments

The technologies herein can provide attestation techniques to confirm the integrity of a device. In some cases, such attestation techniques can implement integrity data (e.g., tokens or metadata elements containing or reflecting security measures taken at the device), which can be included in packets and used to confirm the integrity or trustworthiness of a device. Disclosed herein are systems, methods and computer-readable storage media for proving trustworthiness of particular devices and/or server elements with respect to forming encrypted network connection, such as using cryptographic protocols such as Secure Shell (SSH), Transport Layer Security/Secure Sockets Layer (TLS/SSL), and/or Internet Protocol Security (IPsec). With respect to the different protocols, each is used for security with respect to the various layers in the Transmission Control Protocol (TCP) model.

SSH is a security protocol that can work with other network protocols like File Transfer Protocol (FTP), Hyper- Text Transfer Protocol (HTTP), and others. SSH can be used in a port-forwarding mode to create a tunnel for other applications. TCP-based applications can tunnel through SSH, e.g. email protocols, programming tools, and business applications. When access to sensitive networks via SSH is requested, wherein a secure handshake for establishing such access is based on a password, public key infrastructure may not be enough. The server could have become compromised so that it is no longer a trusted entity. Similarly, the client could be a compromised and thus non-trustworthy device, which could create harm to the network once connected. For increased security, trustworthiness of the supplicant and authenticator can be verified before a connection to the network is established, and in an ongoing way, after the connection was established. The SSH mutual authentication method can be extended with attestation, which includes an integrity check for both the software as well as the hardware of the protocol participants.

TLS or SSL are not single protocols like SSH, but provide security through implementation into applications (TLS being the latest version of the SSL technology). When applications need to perform peering over sensitive networks using TLS/SSL, wherein mutual authentication of the applications across network is based on a password, public key infrastructure may not be enough. The application or the operating system or the compute it is hosted on could have become compromised so that it is no longer a trusted entity. For the applications that can influence how the critical infrastructure behaves it is important to establish TLS connections only with applications that can be verified to be trusted. Trustworthiness of the client/server application has to be verified before a connection is established. The TLS/SSL mutual authentication method can be extended with attestation, which includes an integrity check for both, the software as well as the hardware of the protocol participants.

IPsec provides security at the IP packet layer (e.g., Network Layer (Layer 3 (L3)) of the Open Systems Interconnection (OSI) model) of the TCP/IP stack. IPsec is a network-level protocol (e.g., L3/Network Layer) incorporated into servers and/or clients, e.g., into a router, switch, dedicated VPN concentrator, firewall or into an operating system's kernel. Site-to-Site IPSec VPN tunnels are used to allow the secure transmission of data, voice, and/or video between multiple sites (e.g., offices or branches). The IPSec VPN tunnel is created over the Internet public network and encrypted using a number of advanced encryption algorithms to provide confidentiality of the data transmitted between the two sites. Internet Key Exchange (IKE/IKEv2) performs mutual authentication between two parties and establishes a virtual private network (VPN) that is used to protect the traffic on the VPN tunnel. IKEv2 mutual authentication method can be extended with attestation of the integrity of the tunnel endpoints/IKEv2 participants.

Figure 8:
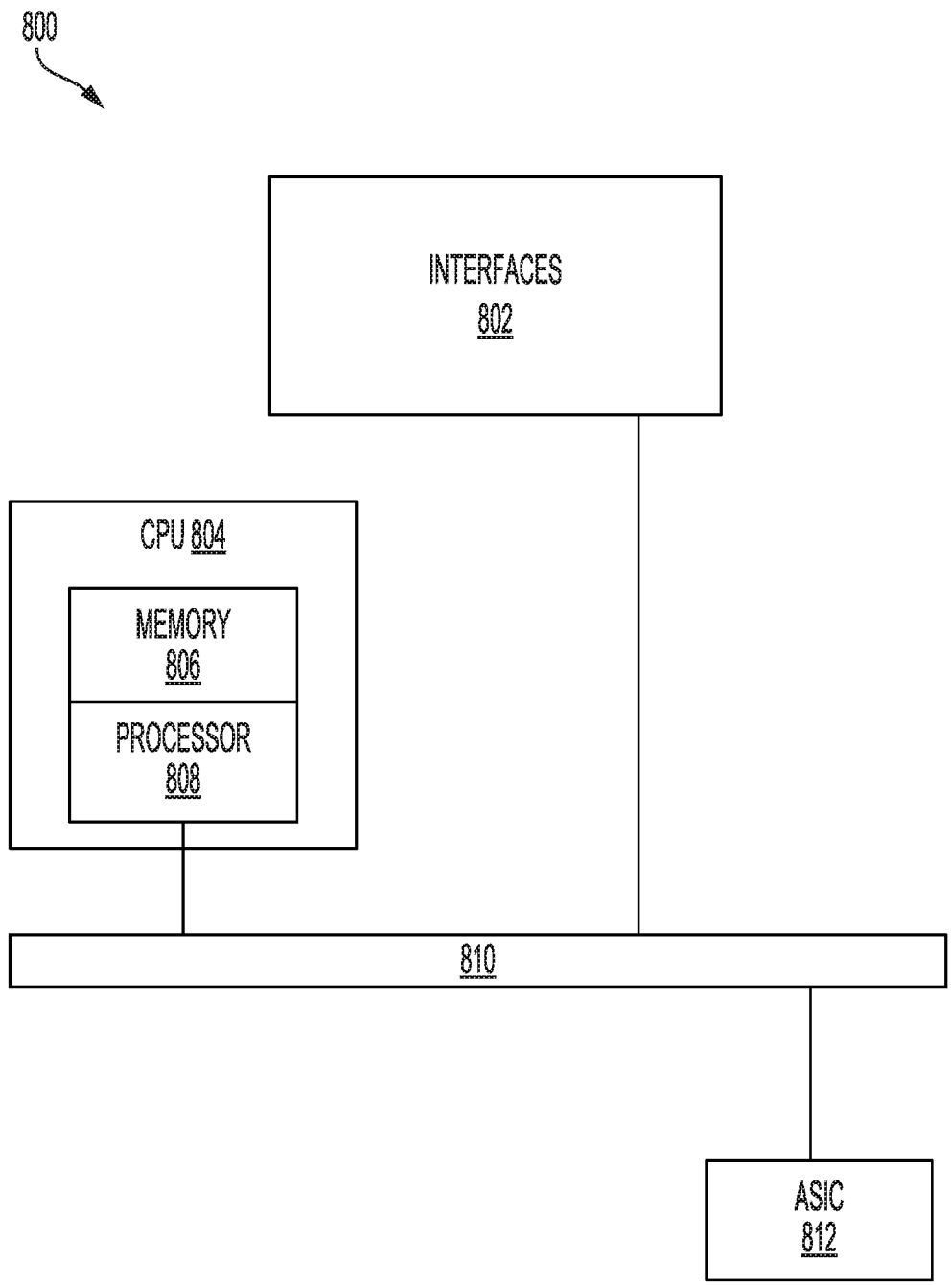
FIG. 8 illustrates an example network device in accordance with some examples.
Figure 9:
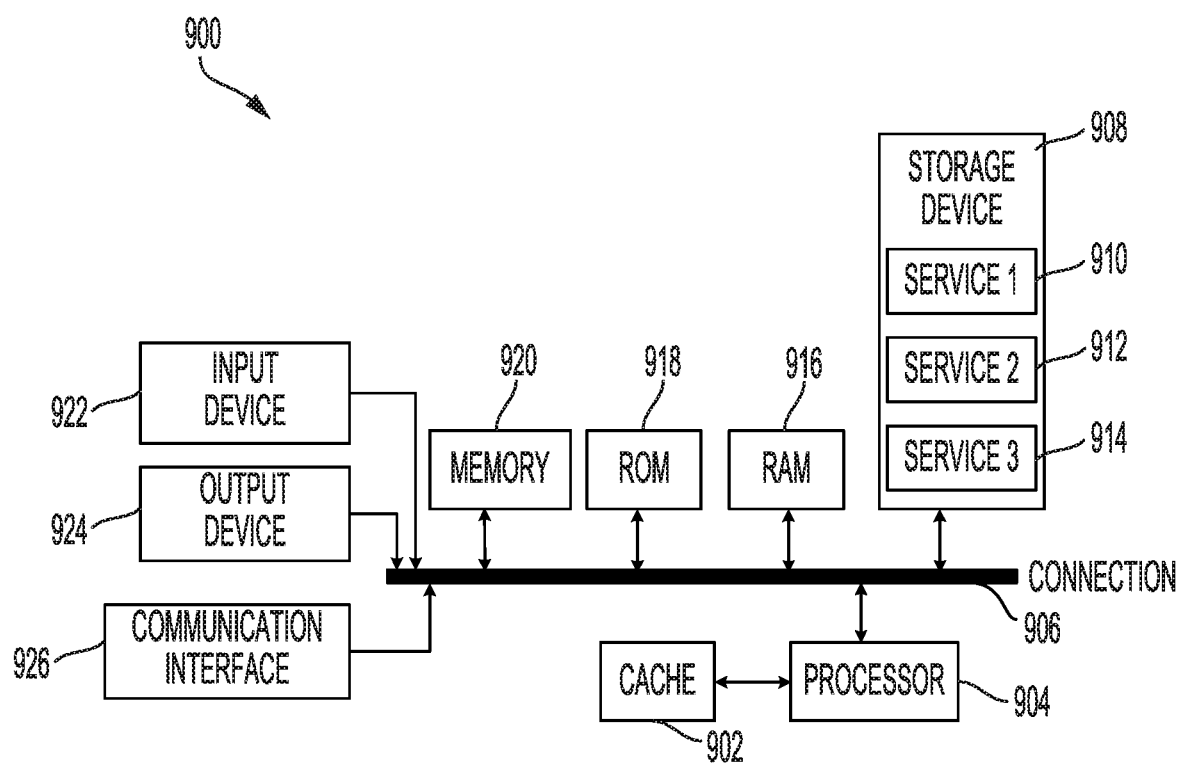
FIG. 9 illustrates an example computing device architecture in accordance with some examples.

The approaches herein can provide systems, methods, and computer-readable storage media for establishing mutual trustworthiness between peer nodes/devices before an encrypted network session is established, wherein an integrity check can be performed for both the software as well as the hardware of the session establishment participants. The disclosure begins with an initial discussion of systems and technologies for providing explicit verifiable proof of integrity of network nodes. A description of example systems, methods and environments for providing verifiable proof of integrity of network nodes, as illustrated in FIGS. 1 through 4, will then follow. In FIGS. 5A through 7B, example flows illustrate how integrity data is transmitted in association with establishing and maintaining trustworthy encrypted network sessions. The discussion concludes with a description of an example network device and an example computing device architecture, as illustrated in FIGS. 8 and 9, including example hardware components suitable for performing various networking and computing operations described herein.

The disclosure now turns to an overview of various, relevant network concepts and an initial discussion of example systems and technologies for providing explicit verifiable proof of integrity of network nodes. A computer network can include different nodes (e.g., network devices, client devices, sensors, and any other computing devices) interconnected by communication links and segments for sending data between end nodes. Many types of networks are available, including, for example, local area networks (LANs), wide area networks (WANs), software-defined networks (SDNs), wireless networks, core networks, cloud networks, the Internet, etc. When data traffic is transmitted through one or more networks, the data traffic typically traverses a number of nodes that route the traffic from a source node to a destination node.

While having numerous nodes available for processing network traffic can increase network connectivity and performance, it also increases security risks as each node that a packet traverses introduces a risk of unauthorized data access and manipulation. For example, when a packet traverses a node, there is a security risk that is introduced which can result from the node being potentially compromised (e.g., hacked, manipulated, captured, etc.). As a result, compliance, security, and audit procedures can be implemented to verify that network users, devices, entities and their associated network traffic comply with specific business and/or security policies.

When sensitive information is transmitted through nodes in a network, such as in a battlefield, banking settings, and healthcare settings, such traffic should be sent through uncompromised nodes to prevent access to, leakage of, or tampering with the data and sensitive information carried by that traffic. If an attacker gains access to a device via some exploit, previous protection and encryption approaches for network interfaces/devices are generally ineffective at mitigating or addressing such unauthorized access and resulting damage.

Proving that network traffic complies with specific policies can involve proving in a secure way that the traffic has traversed a well-defined or known set of network nodes or hops (e.g., firewalls, switches, routers, etc.) and that such network nodes or hops have not been modified or compromised. This can help ensure that the network nodes or hops have performed their expected or intended actions (e.g., packet processing, security or policy compliance verification, routing, etc.) on the packet and that the packet has traversed the network nodes or hops.

Some security approaches can aim at removing any implied trust in the network used for connecting applications hosted on devices to network, cloud or enterprise hosted services. Moreover, some security approaches can be implemented to verify the trustworthiness (e.g., the integrity, identity, state, etc.) of the network and/or nodes traversed by packets. In some cases, certain verification checks can be implemented to validate or verify that traffic has traversed a specific set of nodes and that such nodes are trusted and uncompromised. In some examples, certain Trusted Platform Module (TPM), attestation, or proof of integrity approaches can be implemented to verify or validate the trustworthiness of a node in a network.

In some cases, TPM can be implemented to collect and report the identity of hardware and software components in a platform to establish trust for that platform. A TPM used in a computing system can report on the hardware and software of the system in a manner that allows verification of expected behavior associated with that system and, from such expected behavior, establishment of trust. The TPM can be a system component containing state that is separate from the host system on which the TPM reports identity and/or other information such as metrics and other integrity data. TPMs can be implemented on physical resources (indirectly or directly) of the host system. In some examples, a TPM component can have a processor and memory such as RAM, ROM and/or flash memory. In other implementations of a TPM, a host processor can run TPM code while the processor is in a particular execution mode. Parts of system memory can be partitioned by hardware to ensure that memory used by the TPM is not accessible by the host processor unless the host processor is in the particular execution mode.

In some cases, trusted computing (TC) implementations, such as TPM, can rely on Roots of Trust. Roots of Trust can be system elements that should be trustworthy because misbehavior by such system elements may not be detectable. A set of roots can provide a minimum functionality that can sufficiently describe characteristics that affect a platform's trustworthiness. In some cases, determining if a Root of Trust is behaving properly may not be possible; however, it may be possible to determine how roots are implemented. For example, certificates can provide assurances that the root has been implemented in a way that renders it trustworthy.

To illustrate, a certificate may identify the manufacturer and evaluated assurance level (EAL) of a TPM. Such certification can provide a level of confidence in the Roots of Trust used in the TPM. Moreover, a certificate from a platform manufacturer may provide assurance that the TPM was properly installed on a system that is compliant with specific requirements so the Root of Trust provided by the platform may be trusted. Some implementations can rely on three Roots of Trust in a trusted platform, including Root of Trust for Measurement (RTM), Root of Trust for Storage (RTS), and Root of Trust for Reporting (RTR).

The RTM can send integrity information, such as integrity measurements, to the RTS. Generally, the RTM can be a processor controlled by a Core Root of Trust for Measurement (CRTM). The CRTM is the first set of instructions executed when a new chain of trust is established. When a system is reset, the processor (e.g., RTM) can execute the CRTM, which can then send values that indicate its identity to the RTS. Thus, in some cases, the starting point for a chain of trust can be established in this manner.

As previously noted, the TPM memory can be shielded from access by an entity other than the TPM. Since the TPM can be trusted to prevent unauthorized access to its memory, the TPM can act as an RTS. Moreover, the RTR can report on the contents of the RTS. An RTR report can be a digitally signed digest of the contents of one or more values in a TPM.

Attestation is another example trusted computing approach that can be used to verify the integrity of a node. Attestation can be applied to a node, such as a router or switch, to review logs from connected devices, such as Layer 1 (L1) and Layer 2 (L2) and/or Layer 3 (L3) connected devices, and maintain these logs in trusted storage. These logs can be protected by embedding a private key into every trust anchor produced for a hardware device, and publishing the device's public key as a certificate to adjacent devices. This peering device can then push log updates from trusted storage periodically and/or on some log entry event. Reviewing any provided signed logs can provide an understanding of the current trustable state of a peer device. Moreover, by looking back at the set of transactions which have occurred since boot time, a determination can be made regarding the trustworthiness of the information which that peer device is asserting.

In some examples, integrity data, which can refer to tokens or metadata elements containing security measurements or evidence, can be used to provide verifiable evidence of device trustworthiness (e.g., integrity, state, etc.). Such verifiable evidence can be appended or included in packets transmitted by nodes on a network. The integrity data can thus be used to evaluate the trustworthiness of a node(s) and react accordingly. For example, a device or entity can review integrity data associated with a node to determine that the node should not be trusted and adjust a network policy to mitigate possible damage. In some implementations, dedicated cryptoprocessors, such as a processor in a TPM platform, can take measurements to attest to the trustworthiness (e.g., identity, integrity, etc.) of a node and its environment (e.g., software, hardware, operating system, running binaries, firmware, etc.). These measurements include evidence that the node is in a safe state (or not). In some cases, these measurements can be provided through integrity data, as previously described. However, a receiver of such evidence should be able to certify that the evidence is "fresh" based on signed data generated within a threshold period of time relative to a current time when the response is sent, evidence produced for a specific packet used to check the integrity/trustworthiness of a sending node, evidence that has not been re-used, etc. Evidence can become stale thereby potentially reducing its effectiveness in reflecting the current trustworthiness of a node. For example, without ensuring freshness of such evidence, an attacker has an opening to inject previously recorded measurements and asserting what is replayed as being current.

In other examples, TPM measurement validation tokens can be used to provide verifiable evidence of device tampering. Such verifiable evidence can be appended to protocol interactions. This provides evidence receivers the option of evaluating trustworthiness of a network device and reacting accordingly. For example, an evidence receiver may determine that it no longer trusts a network device and, as a result, adjust a network policy to mitigate possible damage. Dedicated crypto-processors, such as a TPM, can take measurements to attest to the identity of a device and its operating binaries. These measurements can include evidence that the device is in a known safe state. However, an evidence receiver should be able to certify the evidence as being current. Without a guarantee that the evidence is current, an attacker has an opening to inject previously recorded measurements, asserting that what is being replayed is current.

There are numerous use cases where a platform assessing whether its peers are trustworthy is advantageous. Being able to perform a unidirectional attestation using an asynchronous push, multicast, or broadcast message in conjunction with trusted binaries opens many possibilities for platforms to assess whether their peers are trustworthy. Detection of invalid attestations can trigger alarms or events reduction of network access from a suspect device, or can become a part of Admission Control (e.g., IEEE 802.1X). Some platforms can be configured to support the unidirectional attestation mechanism.

Alternate approaches for validating data as being current that do not rely on a nonce can be based on trusted computing capabilities, such as a TPM. For example, a TPM measurement validation token can be generated which allows external entities to validate asserted data as being current based on the state of internal counters within the TPM. With this token, replay attacks can be detected without use of a nonce, and attestation for asynchronous push, multicast, and broadcast can be done. The TPM measurement validation token can include a digitally signed measurement that can be used to prove its authenticity and can indicate an early sign of a potential issue.

Such an approach can be combined with TPM-integrated capabilities aimed at verifying that valid processes are being executed. These capabilities can include, for example, Trusted Execution Environments (TEE), which provide runtime malware protections, Authenticated Code Modules (ACM), which ensure that only digitally signed code modules can be loaded into a CPU, and the like. The alternate approach for validating asserted data as being current can work with Cisco® Secure Boot, the Linux® Integrity Measurement Architecture (IMA), Intel® Trusted Execution Technology (TXT), etc. These technologies can validate that a processor is running known software with a valid chain of binary signatures.

The creation of the TPM measurement validation token can be accomplished by extracting current counters from an attestee's TPM and hashing these current counters with information within an external TPM. The result can be a non-spoofable token that binds continuously incrementing counters on an attestee with some known external state information. Any resetting of the TPM counters is visible in any subsequent TPM queries. Any restarting of a platform is exposed in subsequent TPM queries. Within these bounds of reset and restart, the TPM's timeticks counter continuously increments. Therefore, any push of attestee TPM information which includes these counters is known to have occurred subsequent to any previously-received measurement. Further, if the reset and restart counters have not changed, the incremental time since any previous measurement is also known.

The majority of information needing to be trusted by network peers may not be contained within the TPM's Program Configuration Registers (PCR). As a result, indirect methods of validating that a device has not been compromised can also be applied.

The receipt of TPM measurement validation tokens can mean that an evidence receiver should have the option of verifying the information. It does not require that supplementary evidence be sent with the TPM measurement validation token. For non-controller based implementations, it also does not require that the verification steps occur on the evidence receiver.

For integrity verification, a controller or device can implement an integrity verification application. The integrity verification application can be designed to recognize change events and evaluate Known Good Values (KGVs), which will also allow evaluation of a boot-integrity TPM measurement validation token and a running process binary signature TPM measurement validation token based on TPM counters. On any discrepancy, a controller can isolate a compromised device from all of its network peers by shutting the interfaces.

Some approaches can detect replay attacks (e.g., replaying of old and/or previously used evidence) via a "nonce". A nonce is a random number that can be used to introduce randomness. In some cases, a nonce can passed into a TPM and/or incorporated into integrity data. In some cases, a result provided by the TPM can include a signature based on the nonce. Since the nonce can be grounded in a transactional challenge/response interaction model, in some cases the nonce may be less effective with unidirectional communications originating from an attesting device. For example, a nonce may be less effective with an asynchronous push, multicast, or broadcast message.

The TPM or other crypto-processor may receive multiple responses from multiple client devices, each response comprising a random number. The random numbers from the responses from the multiple client devices can form a set of random numbers, and the set of random numbers can be algorithmically combined into a single nonce. In some examples, the single nonce can be passed through a crypto-processor to generate a signature based on the single nonce. The set of random numbers may be combined algorithmically into a single nonce using a Bloom filter.

The TPM or other crypto-processor may maintain a Bloom filter or other probabilistic data structure to indicate that the TPM or other crypto-processor has obtained a set of nonces from various verifier peer devices over a period of time. A probabilistic data structure (e.g., Bloom filter) may be a data structure configured such that, when maintained correctly, a query against the probabilistic data structure (e.g., to determine whether an element is in a set) has a non-zero probability of being incorrect (e.g., due to a hash collision). For instance, in some implementations, a probabilistic data structure is configured such that the probability of a false positive is below a specified threshold to balance the computational efficiency provided by the data structure with the inconvenience caused by reliance on a response from the other peer system as a result of a false positive. Other techniques to mitigate against false positives, such as by reference to a database only when an issue with the other peer devices is potentially detected, may be used such that additional computing resources are used to make sure there was an integrity issue only when the potential of an integrity issue having occurred has been detected.

To add a nonce to the Bloom filter, the TPM or other crypto-processor may use the nonce to be added as an input to an entry function. The output of this entry function may be hashed and this hash result may be used to set a number of bits within the Bloom filter from zero to one. This serves to indicate that the nonce is now within the Bloom filter. A verifier peer device obtaining this Bloom filter may use the same entry function and hash function(s) used by the TPM or other crypto-processor to identify the bits of the Bloom filter that correspond to the nonce it is querying for. If the bits identified by the verifier peer device are each set to one, the verifier device may determine, subject to the false positive probability, that the TPM or other crypto-processor utilized the nonce to generate the Bloom filter bit array. Alternatively, if any of the bits identified by the verifier peer device are set to zero, then the verifier peer device may determine that the nonce it provided to the other peer device was not processed by the TPM or other crypto-processor, indicating an issue with the provided integrity data.

In some implementations, to mitigate the risk of false positives, the TPM or other crypto-processor identifies a limited number (e.g., batch size) of nonces obtained over a period of time that may be added to the Bloom filter or other probabilistic data. The bit array generated by the TPM or other crypto-processor using the various nonces obtained over a period of time from one or more verifier peer systems may be provided to the TPM of the other peer devices to digitally sign the response that is to be provided to the verifier peer device. Thus, rather than including the nonce provided by the verifier peer device, the digitally signed response to the API call from the verifier peer device may include the Bloom filter and the integrity data obtained by the TPM or other crypto-processor.

However, there are numerous use cases where a platform assessing whether its peers are trustworthy is advantageous. Being able to perform a unidirectional attestation using an asynchronous push, multicast, or broadcast message in conjunction with trusted binaries opens many possibilities for platforms to assess whether their peers are trustworthy. Detection of invalid attestations can trigger alarms or events, reduction of network access from a suspect device, or can become a part of Admission Control (e.g., IEEE 802.1X). Some platforms can be configured to support the unidirectional attestation mechanism.

Other freshness approaches can be based on trusted computing capabilities, such as TPM. For example, a token can be generated which allows external entities to validate freshness of asserted data based on the state of internal counters within the TPM. This token can be used to detect replay attacks, and provide attestation for asynchronous push, multicast, and broadcast messages. In some cases, such tokes can include and/or be referred to as integrity data.

Various of the foregoing approaches can be combined with TPM-integrated capabilities aimed at verifying that valid compute components, such as binary processes, are running on a node. These capabilities can include, for example, Trusted Execution Environments (TEE) which provide runtime malware protections, Authenticated Code Modules (ACM) which ensure that only digitally-signed code modules can be loaded into a processor, and the like. These technologies can validate that a processor is running known software with a valid chain of binary signatures.

In some cases, integrity data (e.g., tokens or metadata elements) can be created by extracting current counters (e.g., clock, reset, restart) or timers from a node's TPM, and incorporating such counters and security measures taken from the node into a packet. In some examples, the current counters and/or security measures can be hashed with information within an external TPM. The integrity data can thereby provide a non-spoofable token or metadata element, which can bind continuously incrementing counters on an attestee with a known external state. Any resetting of the TPM counters is visible in any subsequent TPM queries, and any restarting of a platform is also exposed in subsequent TPM queries. Within these bounds of reset and restart, the TPM's time ticks counter continuously increments. Therefore, any push of attestee TPM information which includes these counters can be determined to have occurred subsequent to any previously-received measurement. Also, if the reset and restart counters have not changed, the incremental time since any previous measurement can also be known.

In some cases, a large amount of information that should be trusted by network peers may not be contained within the TPM's Program Configuration Registers (PCR). As a result, indirect methods of validating that a node has not been compromised can be applied.

The receipt of integrity data can mean that a receiver should have the option of verifying the information. In many cases, such verification can be performed without the need of supplementary evidence being sent with the integrity data. Moreover, in non-controller based or centralized implementations, the verification steps do not have to occur at the receiver.

In some integrity verification implementations, a controller or device can implement an integrity verification application. The integrity verification application can be designed to recognize change events and evaluate known good values, which allow evaluation of a boot-integrity stamp and a running process binary signature stamp based on, for example, TPM counters, timestamps, nonces, and/or time tokens. On any discrepancy, a controller or centralized device can isolate a compromised node from its network peers by shutting down the interfaces of the node.

In some examples, integrity data (e.g., tokens or metadata elements) and/or verifications for integrity can be implemented, such as a measured-boot stamp (e.g., SHA1 hash over PCRs 0-7), a verified-boot stamp (e.g., which can verify that only recognized binaries were executed when booting), a process-stamp (e.g., root-of-trust validated through a process which is asserting a particular protocol or protocols), a file-system stamp (e.g., all files within a vendor determined set of directories), a log-integrity stamp (e.g., used to augment existing integrity analytics and forensics), a configuration stamp (e.g., State of the current device configuration), etc. Some implementations can achieve all or some of these stamps, depending on the implementation. Moreover, in some implementations, all or some of these stamps can be implemented or achieved using a single or multiple stamps.

As previously explained, TPM provides methods for collecting and reporting the identity of hardware and software components in a platform to establish trust for that platform. TPM functionality can be embedded in a variety of devices including mobile phones, personal computers, network nodes (e.g., switches, routers, firewalls, servers, network appliances, etc.), and/or any other computing devices. Further, attestation can describe how the TPM can be used as a hardware root of trust and offer proof of integrity of a node. Such integrity can include hardware integrity, software integrity (e.g., micro loader, firmware, boot loader, kernel, operating system, binaries, files, etc.), and runtime integrity.

In some cases, TPM and attestation can be implemented as described herein to provide proof of integrity and proof of transit through uncompromised nodes. In some examples, integrity data (e.g., tokens or metadata elements containing or reflecting security measures) is used as previously mentioned to validate the integrity of a node and perform continuous evaluation of node integrity. Thus, the integrity data described herein can be used to provide proof of transit through uncompromised nodes. In some examples, integrity data can be added as additional metadata to packets that traverse a network where proof of transit via uncompromised nodes is desired. Having provided an initial discussion of example concepts and technologies for providing explicit verifiable proof of integrity of network nodes, the disclosure now turns to FIG. 1.

FIG. 1 is a block diagram of an example networking environment 100 in accordance with some implementations. While pertinent features are shown, those of ordinary skill in the art will appreciate from the present disclosure that various other features have not been illustrated for the sake of brevity and so as not to obscure aspects of the example implementations disclosed herein.

In this example, the networking environment 100 can include a network 114 of interconnected nodes. The network 114 can include a private network, such as a local area network (LAN), and/or a public network, such as a cloud network, a core network, and the like. In some implementations, the network 114 can also include one or more sub-networks, such as sub-network 114A. Sub-network 114A can include, for example and without limitation, a LAN, a virtual local area network (VLAN), a datacenter, a cloud network, a wide area network (WAN), etc. In some examples, the sub-network 114A can include a WAN, such as the Internet. In other examples, the sub-network 114A can include a combination of nodes included within a LAN, VLAN, and/or WAN.

The networking environment 100 can include a source node 102. The source node 102 can be a networking device (e.g., switch, router, gateway, endpoint, etc.) associated with a data packet that is destined for a destination node 116. The networking environment 100 can also include an attestation routing orchestrator 104. The attestation routing orchestrator 104 can communicate with the destination node 116. In some implementations, the attestation routing orchestrator 104 can obtain integrity data (e.g., integrity data, security measures, signatures, and/or metadata) or vectors from the destination node 116.

The attestation routing orchestrator 104 can communicate with a verifier system 106. In some implementations, the attestation routing orchestrator 104 can obtain trusted state information from the verifier system 106. As will be described in great detail with reference to FIG. 4, the attestation routing orchestrator 101 selects, and directs a data packet to, a particular candidate next-hop node of the plurality of candidate next-hop nodes 104-1-104-N based on the trusted image vector and the first plurality of attestation vectors. Moreover, the attestation routing orchestrator 101 directs the data packet destined for the destination node 11R6 to the particular candidate next-hop node.

The verifier system 106 can include a verified state repository 106A and one or more servers 106B. In some examples, the verified state in the verified state repository 106A can include one or more verified images, verified security measurements, verified settings, verified node data, and/or any other verified trust or integrity data. In some implementations, the verified state in the verified state repository 106A can include one or more trusted states or image vectors that are known with a degree of confidence to represent uncompromised states or images (e.g., states or images that have not been hacked, attacked, improperly accessed, etc.). In some implementations, the verifier system 106 includes one or more trusted image vectors that are known with a high degree of confidence to have not been compromised (e.g., hacked, attacked, improperly accessed, etc.).

Figure 2:
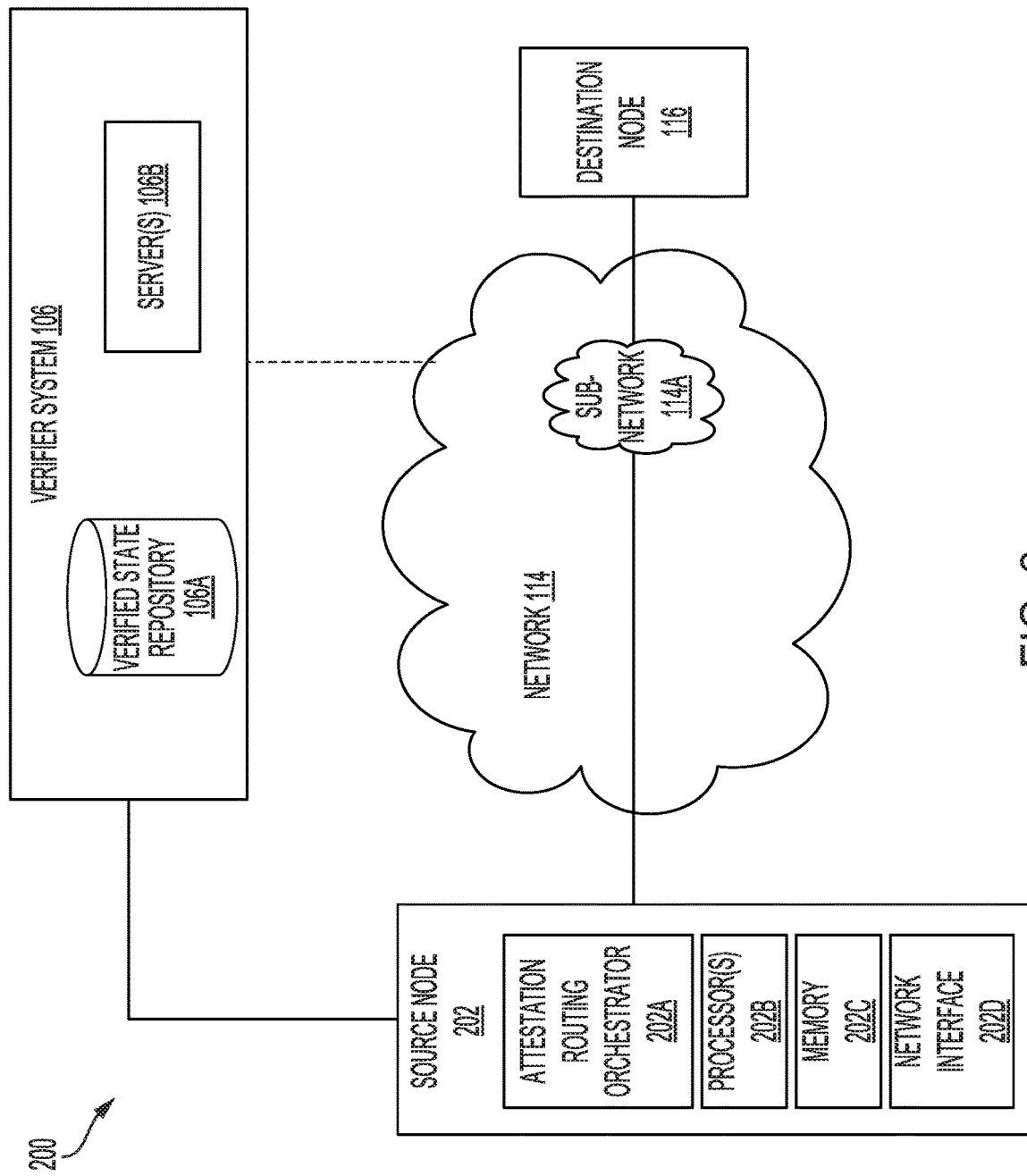

FIG. 2 is a block diagram of another example networking environment 200 in accordance with some implementations. In this example, the networking environment 200 includes a source node 202 that implements an attestation routing orchestrator 202A. In some implementations, the attestation routing orchestrator 202A can be similar to, or adapted from, the attestation routing orchestrator 104 in FIG. 1.

The source node 202 can include one or more processors 202B. In some implementations, the one or more processors 202B can provide processing resources for generating a confidence scores for the destination node 116. In some implementations, the one or more processors 202B can provide processing resources for selecting a particular confidence score, from the confidence scores, that satisfies one or more selection criteria.

In some examples, the source node 202 can include a memory 202C. The memory 202C can be, for example and without limitation, a non-transitory memory, such as RAM (random-access memory), ROM (Read-only memory), etc. The memory 202C can store the data, such as the packet destined for the destination node 116. In some implementations, the memory 202C can store a trusted state or image vector obtained from the verifier system 106. In some implementations, the memory 202C can store attestation states or vectors obtained from the destination node 116 and optionally attestation states or vectors obtained from the destination node 116. The source node 202 can also include a network interface 202D for obtaining, receiving, and transmitting the data packets and states or vectors. In some implementations, the source node 202 can select and direct a data packet to the destination node 116 based a trusted state or image vector and the attestation states or vectors.

Figure 3:
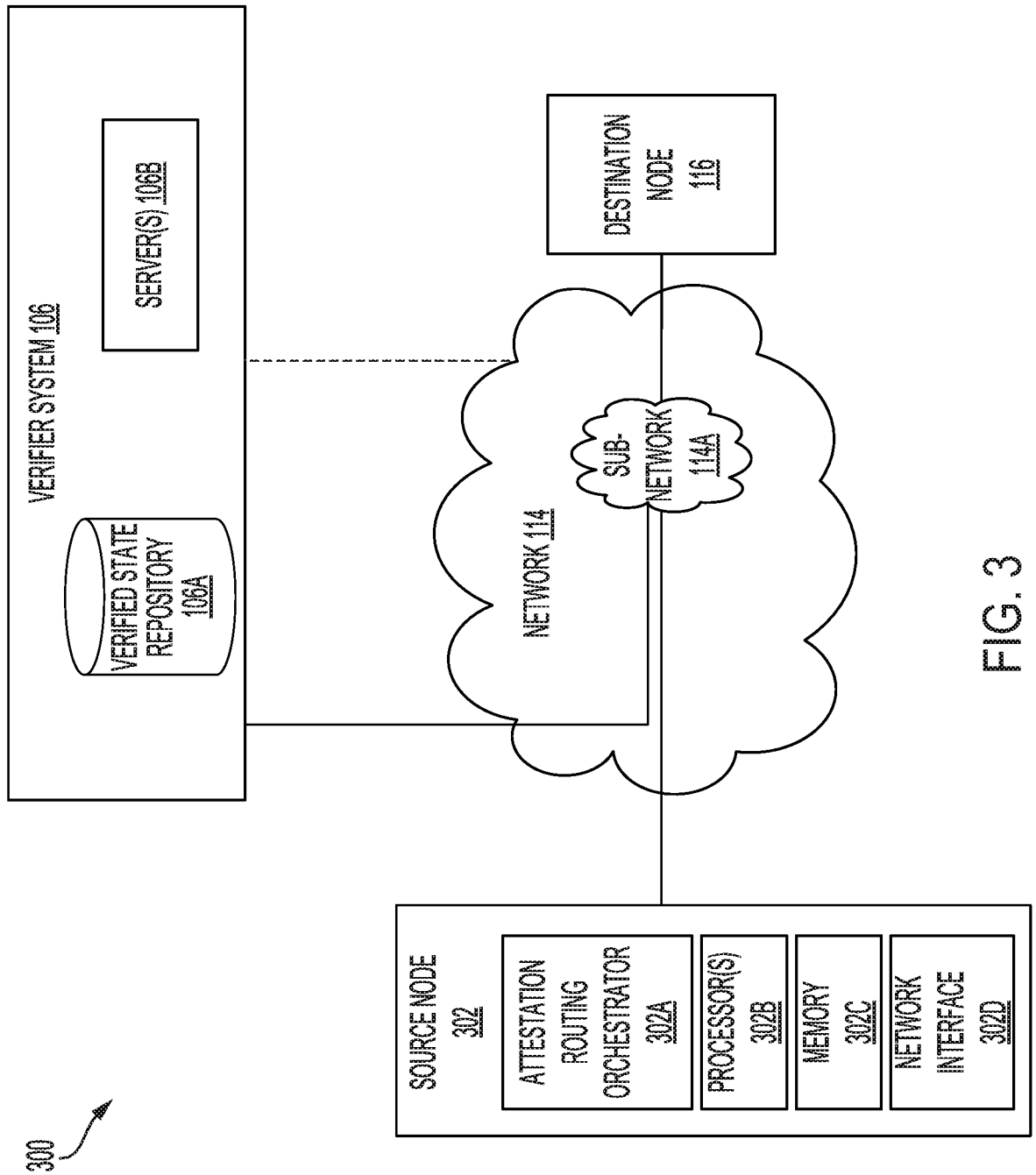

FIG. 3 is a block diagram of another example networking environment 300 in accordance with some implementations. In this example, the destination node 116 can relay a trusted state or image vector from the verifier system 106 to the source node 302. In some implementations, the attestation routing orchestrator 302A can be similar to, or adapted from, the attestation routing orchestrator 104 in FIG. 1 and/or the attestation routing orchestrator 202A in FIG. 2.

In some implementations, the verifier system 106 can sign the trusted state or image vector and provide the signed trusted state or image vector to the destination node 116, which in turn can provide the signed trusted state or image vector to the source node 302.

Moreover, in implementations in which the source node 302 is not connected to the verifier system 106 (e.g., link down), obtaining the trusted state or image vector from the destination node 116 provides an alternative mechanism for node attestation. In some implementations, the verifier system 106 appends a time-stamped response to the trusted state or image vector as part of the signing process, which can be referred to as stapling. Consequently, the source node 302 may not contact the verifier system 106 in order to attest the destination node 116.

Figure 4:
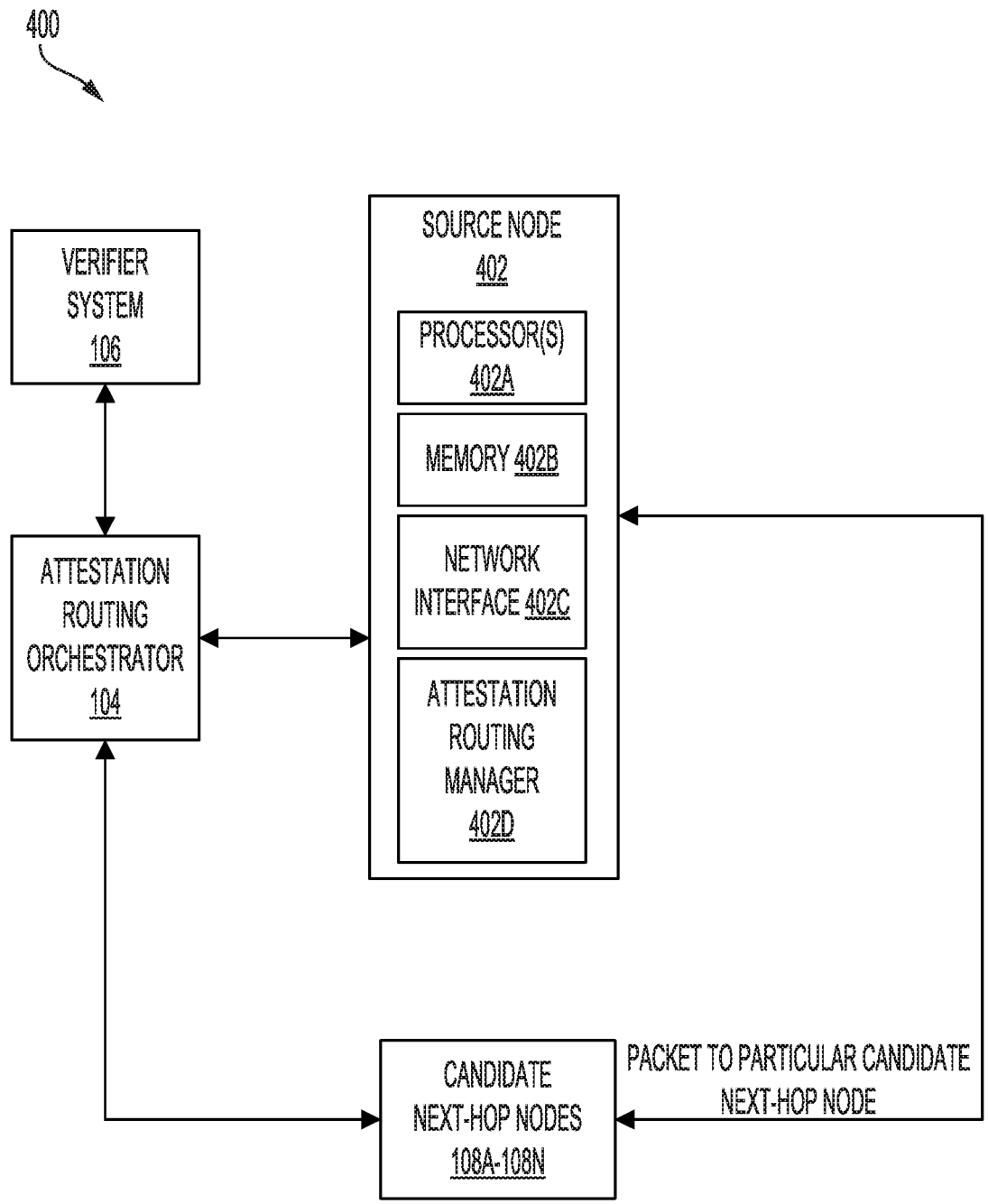
FIG. 4 illustrates an example of a controller orchestrated attestation-based routing, in accordance with some examples.

FIG. 4 is a block diagram of an example controller-orchestrated attestation-based routing environment 400, in accordance with some implementations. In some examples, the source node 402 is similar to, or adapted from, the source node 102 in FIG. 1. As illustrated in FIG. 4, the attestation routing orchestrator 104 is separate from, but coupled (e.g., connected) to, the source node 402. In some examples, the attestation routing orchestrator 104 can include a controller with knowledge of the network 114 that includes candidate next-hop nodes 108A-N. For example, in some implementations, the attestation routing orchestrator 104 can be a network management system (NMS). As another example, in some implementations, the attestation routing orchestrator 104 can be an intent-based networking system, such as Cisco's Digital Network Architecture (DNA) and Cisco's Crosswork. As yet another example, in some implementations, the attestation routing orchestrator 104 can be a wireless LAN controller (WLC).

The attestation routing orchestrator 104 can obtain integrity data (e.g., integrity data) from the destination node 116. The attestation routing orchestrator 104 can determine confidence scores based on the integrity data. For example, in some cases, each of the confidence scores can be based on a comparison between a corresponding one of the integrity data and a trusted state or image vector. In some implementations, the attestation routing orchestrator 104 can obtain the trusted state or image vector from the verifier system 106. The attestation routing orchestrator 104 can select, from the confidence scores, a particular confidence score that satisfies one or more selection criteria.

The attestation routing orchestrator 104 can direct a data packet destined for the destination node 116. For example, in some cases, the attestation routing orchestrator 104 can provide attested route information (e.g., validated integrity data, security measurements, etc.) to an attestation routing manager 402D of the source node 402 in order to facilitate the source node 402 sending the data packet to the destination node 116. The attested route information can be indicative of the trustworthiness of the route to the destination node 116.

For example, in some implementations, the attested route information includes an identifier (e.g., an IP address, a MAC address, an SSID, etc.) identifying the destination node 116. In this example, the source node 402 can provide the data packet based on the identifier in order to route the data packet to the secure destination node 116.

As another example, in some implementations, the attested route information can include confidence scores associated with the destination node 116. In this example, the attestation routing manager 402D can select a particular candidate score based on one or more selection criteria. Moreover, the attestation routing manager 402D can provide the data packet to the destination node 116 associated with the particular candidate score. In some examples, the attestation routing orchestrator 104 can cease to direct additional data packets to the particular destination node 116 in response to determining that the particular confidence score falls below a confidence threshold.

In some cases, the source node 402 can include one or more processors 402A. The one or more processors 402A can provide processing resources for managing attested route information obtained from the attestation routing orchestrator 104. The source node 402 can also include a memory 402B. The memory 402B can include, for example, a non-transitory memory such as RAM, ROM, etc. In some examples, the memory 402B can store data such as the obtained attested route information and data packets to be transmitted. The source node 402 can also include a network interface 402C for obtaining the attested route information and sending/receiving other data.

In some cases, whether a network device has been compromised can be determined based on indicators associated with the network device and time information. The indicators can include, but are not limited to, a set of security measurements or evidence footprints which indicate whether a particular device is compromised. Such indicators can come from one or more sources such as, for example and without limitation, TPM, integrity data, Syslog, YANG Push, EEM, peer devices, traffic counters, and other sources. Visibility can be a method of identifying a compromise in a timely manner.

As a further advantage of the present disclosure, it should be noted that encryption alone may be insufficient to protect sensitive flows since, for example, there are scenarios where even the fact that a flow is occurring between endpoints might be considered information to be protected.

The source node 102 may act as the attestor in connection with the attestation routing orchestrator 104 to attest as to the trustworthiness of the destination node 116, wherein the proof of integrity and freshness may be determined using the above-mentioned methods. Depending on which device is the attestor/attestee, the attestor serves as the source node 102 and the attestee serves as the destination node 116. The ability for any of these devices to attest as to the trustworthiness of another device that it plans on establishing a connection with is important for not only determine if the device in a good state but also that the device is the device it claims to be. There are various forms of attacks, such as MAC address spoofing, identity forging, cache poisoning, and man-in-the-middle attacks wherein the attesting the identity and whether the device is in a good state is important before establishing a connection is important.

When the response with attestation of integrity is received, the recipient of the attestation of integrity may validate the integrity of the attestee. Based on the level of trust, various policies can be applied e.g., establish an encrypted network session or denying establishment of the encrypted network session and once the connection is established, a heart-beat message may be communicated back and forth to reevaluate the integrity of the attestee at certain set intervals.

SSH Attestation

Figure 5A:
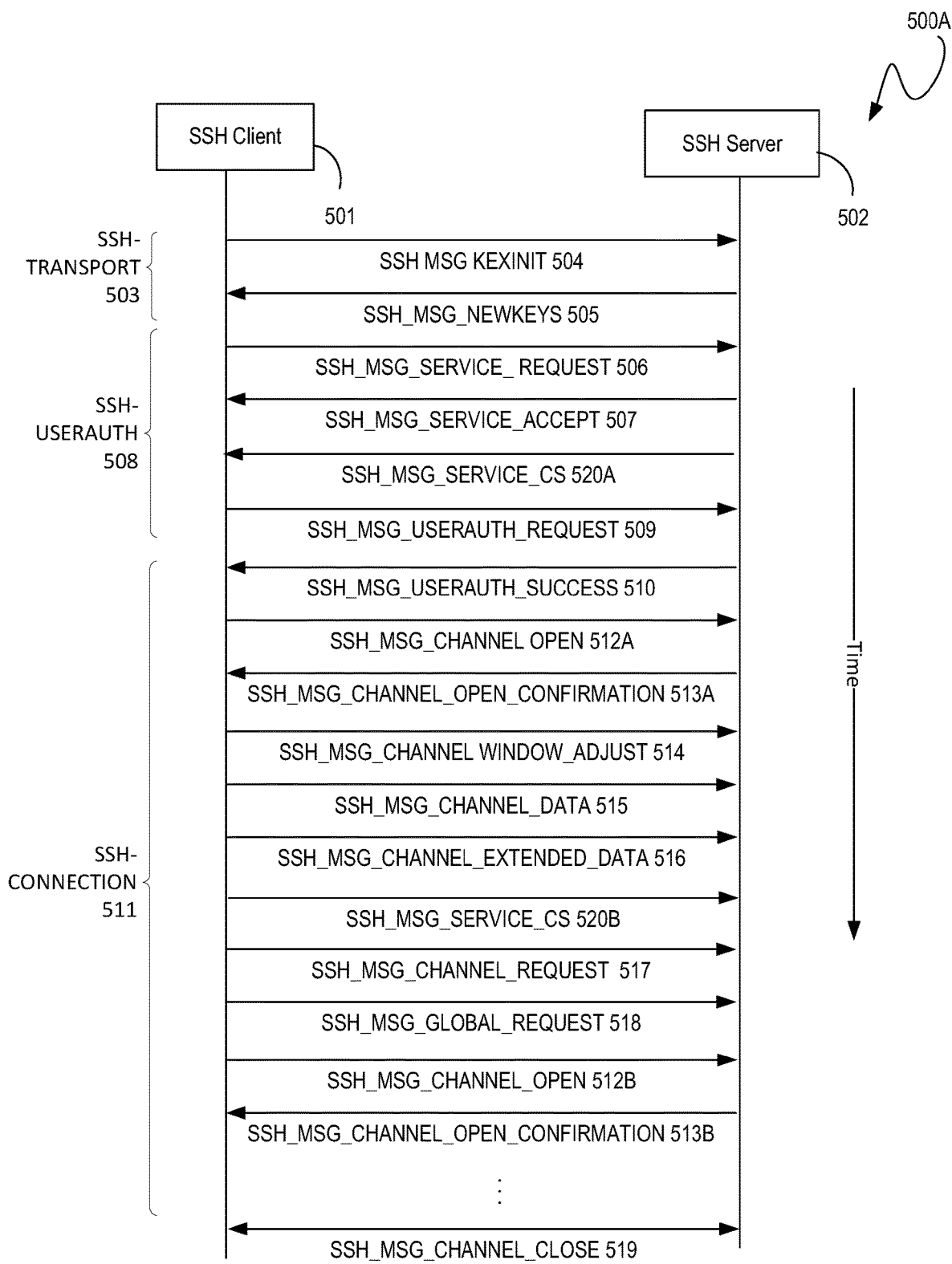
FIG. 5A illustrates an example call flow for attestation between a Secure Shell (SSH) client and a SSH server associated with establishing and/or maintaining a trustworthy encrypted network session in accordance with some examples.

FIG. 5A is an example call flow 500 for attestation between a Secure Shell (SSH) client 501 and an SSH server 502 associated with establishing and maintaining a trustworthy encrypted network session. In this example, the SSH client 501 and the SSH server 502 can represent any physical and/or virtual network or computing nodes, such as the source node 102 and the destination node 116 shown in FIGS. 1 through 3, with SSH capabilities.

Before the SSH client 501 and the SSH server 502 establish an encrypted network session (and/or to establish an encrypted network session), the SSH client 501 and the SSH server 502 can each leverage the SSH protocol to verify that the respective peer node/device has not been compromised. In establishing an SSH session, during SSH server authentication, the SSH server 502 can send, in addition to server credentials (e.g., pubkey or certificate), additional information to the SSH client 501 to convey integrity-related data. Non-limiting examples of such information can include information about secure boots and corresponding boot metrics, logs on all software changes made on the node/device, software-version checksums for various processes, proof that the node/device is known to support trusted storage for any of the information being provided, and integrity of hardware components, such as central processor units (CPUs) and neural processor units (NPUs).

As shown in FIG. 5A, the SSH client 501 and SSH server 502 can send SSH messages to one another. In an SSH-TRANSPORT phase 503, the SSH client 501 may send an initial key exchange (KEX) message 504 (SSH_MSG_KEXINIT message) to the SSH server 502. The SSH server 502 can respond with new keys in a SSH_MSG_NEWKEYS message 505, and the SSH client 501 can then send a service request message 506 (SSH_MSG_SEVICE_REQUEST) to the SSH server 502. The SSH server 502 can respond with a service request acceptance message 507 (SSH_MSG_SEVICE_ACCEPT).

For exchange of integrity data, a new set of SSH messages can be defined, such as, for example, SSH_MSG_CS messages 520A, 520B which can carry integrity data between the two protocol parties at regular intervals. The integrity data can also be attached to any SSH message after SSH-TRANSPORT phase 503 that is transferred to/from the SSH server 502 or a new message can be defined. If the integrity data is exchanged along withan initial message such as the initial key exchange (KEX) message 504 (SSH_MSG_KEXINIT message) between the SSH client 501 and the SSH server 502, this may prevent a man-in-the-middle attack.

In an SSH-USER AUTH phase 508, the SSH client 501 can send a SSH_MSG_USERAUTH_REQUEST message 509, which can include a request to authenticate with the SSH server 502. In some examples, the SSH_MSG_USER-AUTH_REQUEST message 509 can include authentication information such as, for example, login credentials (e.g., username and password), an authentication token, a security key, and/or any other type of authentication information or credentials. The SSH server 502 can respond to the SSH_MSG_USERAUTH_REQUEST message 509 with a SSH_MSG_USERAUTH_SUCCESS message 510. For example, the SSH server 502 can validate information in the SSH_MSG_USERAUTH_REQUEST message 509 and authenticate the SSH client 501. Once the SSH server 502 is able to authenticate the SSH client 501, the SSH server 502 can send the SSH_MSG_USERAUTH_SUCCESS message 510 to the SSH client 501, indicating that the SSH client 501 has been successfully authenticated.

During the SSH SESSION CONNECTION stage 511, the SSH client 501 can send an SSH_MSG_CHANNEL_OPEN message 512A, requesting to establish an SSH session. The SSH server 502 can respond with an SSH_MSG_CHANNEL_OPEN_CONFIRMATION message 513A, which can establish the SSH session between the SSH client 501 and the SSH server 502. In some examples, the SSH client 501 can further send various other messages, such as an SSH_MSG_CHANNEL_WINDOW_ADJUST message 514, which is used to change how many bytes the other party can send before needing to wait a window to be adjusted, an SSH_MSG_CHANNEL_DATA message 515, which is used for data transfer, an SSH_MSG_CHANNEL_EXTENDED_DATA message 516, which is also used for data transfer but with a separate integer that can specify the type of data, an SSH_MSG_CHANNEL_REQUEST messages 517, which are channel-specific requests, and/or an SSH_MSG_GLOBAL_REQUEST message 518, which affects the state of the receiver (the SSH server 502 in this case) of the message globally, independent of any channels.

In some cases, the SSH client 501 can also send another SSH_MSG_CHANNEL_OPEN message 512B, to which the SSH server 502 can respond with another SSH_MSG_CHANNEL_OPEN_CONFIRMATION message 513B. The SSH client 501 can also close the SSH channel/session by sending an SSH_MSG_CHANNEL_CLOSE message 519 requesting to close the SSH channel/session, to which the SSH server 502 can respond with an SSH_MSG_CHANNEL_CLOSE message 520 for closing the SSH channel/session.

The integrity data may be attached to any SSH messages from the SSH client 501 and/or the SSH server 502 to authenticate the integrity of the other (e.g., the SSH client 501 and/or the SSH server 502) at any point of the process of establishing and maintaining the encrypted network session. For example, the integrity data can be included in SSH_MSG_KEYINIT 504, the SSH_MSG_SEVICE_REQUEST message 506, the SSH_MSG_USERAUTH_REQUEST message 509, and/or SSH_MSG_CHANNEL_OPEN_CONFIRMATION 513B, and/or any other messages sent between the SSH client 501 and/or the SSH server 502, which can be used by the recipient (e.g., SSH client 501 or SSH server 502) of such integrity data to verify the integrity of the sender (e.g., SSH client 501 or SSH server 502).

In some examples, the integrity-related data that serves as integrity data can be aggregated into integrity data. The SSH client 501 and/or the SSH server 502 can review this integrity data and decide whether to continue or reject SSH session establishment or not. Some of the integrity-related data may be continuously provided by the SSH server 502 while a session is alive, either periodically or on demand (e.g., SSH client re-ask or SSH rekey interval) or on event (e.g., PCR change on SSH server 502) and the session can be terminated immediately if the SSH server 502 fails to provide integrity data or the integrity data provided does not indicate trustworthiness. Moreover, SSH client 501 can alert a central authority or notify the network of the untrustworthiness of the SSH server 502.

Providing integrity data verification on an SSH session can provide benefits not only for remote login operations or applications but also many other applications which can use SSH to communicate. For example, integrity data verification can be used in secure copy (SCP) and SSH file transfer protocol (SFTP) for file transfers, network configuration protocol (netconf) for device configuration, X11 port-forwarding using SSH, etc.

Note that the above described roles could also be reversed. For example, the SSH server 502 can validate the integrity data of the SSH client 501 and decides on whether the SSH client 501 is allowed to connect to the network and proceed with authentication and/or continue to be connected to the network.

SSL/TLS Attestation

Attestation-based trust may also be established for TLS connections for variety of applications/protocols. TLS/SSL client and server messages can be extended to carry information for proof of integrity and/or validating proof of integrity, which may be accompanied with a signature to prove a freshness and authenticity/validity of the proof of integrity, e.g., by adding a signature over a random data/nonce presented by the peer. For example, a TLS/SSL Client Hello message can contain random data, and can serve as intention to validate proof of integrity. A TLS/SSL Server Hello message can be extended to carry proof of integrity data along with a signature over random data received in the TLS/SSL Client Hello message. In some examples, TLS 1.3 can be extended with a new ExtensionType as defined in: https://tools.ietf.org/html/rfc8446#section-4.2, the contents of which are incorporated herein by reference in their entirety.

Integrity data can be added to the TLS/SSL messages as an extension. The integrity data added can include, for example and without limitation, a hardware fingerprint (e.g., derived from a Secure Unique Device Identification (SUDI) certificate or the like) and/or integrity data. The client and server can use this information to verify whether a peer (e.g., the client, the server, an intermediary hop, etc.) is trustworthy. If the verification is successful, the TLS/SSL session is established. Applications such as RESTConf, GRPC, HTTPS, which can be used for provisioning a network device, can utilize this extension to TLS/SSL to validate and make policy decisions to establish/drop the connection.

Figure 5B:
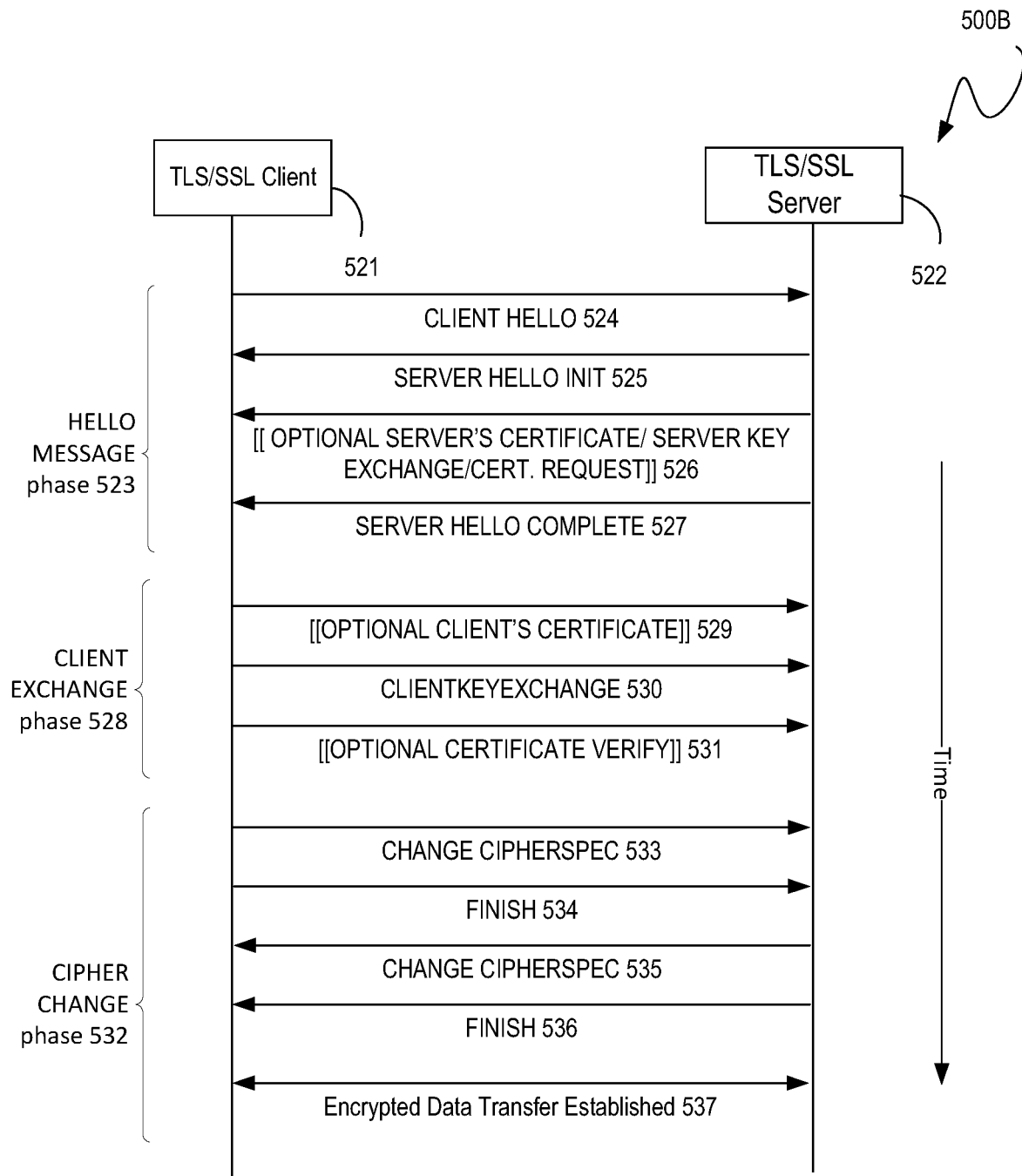
FIG. 5B illustrates an example call flow for attestation between a Transport Layer Security (TLS)/Secure Sockets Layer (SSL) client and a TSL/SSL server associated with establishing and/or maintaining a trustworthy encrypted network session in accordance with some examples.

FIG. 5B is an example call flow 500B for attestation between a TLS/SSL client 521 and a TLS/SSL server 522 associated with establishing and maintaining a trustworthy encrypted network session. In this example, the TLS/SSL client 521 and the TLS/SSL server 522 can represent any physical and/or virtual network or computing nodes, such as the source node 102 and the destination node 116 shown in FIGS. 1 through 3, with TLS/SSL capabilities. As shown in FIG. 5B, the TLS/SSL client 521 and the TLS/SSL server 522 may send messages to one another.

In a HELLO MESSAGE phase 523, the TLS/SSL client 521 can send a CLIENT HELLO message 524 to the TLS/SSL server 522, requesting to establish a TLS/SSL communication session. The TLS/SSL client 521 can also send the CLIENT HELLO message 524 in response to a HELLOREQUEST or on its own initiative in order to renegotiate the security parameters in an existing connection. The CLIENT HELLO message 524 may include a random structure that can be used later in the TSL/SSL protocol, a variable-length session identifier, and a combination of cryptographic algorithms supported by the TLS/

SSL client 521. The CLIENT HELLO message 524 may also include a request for integrity data to authenticate the integrity of the TLS/SSL server 522 or provide integrity data to authenticate the integrity of itself to the TLS/SSL server 522.

The TLS/SSL server 522 can respond with a SERVER HELLO INIT message 525 if and when the server is able to find an acceptable set of algorithms; otherwise, the TLS/SSL server 522 responds with a handshake failure alert. In some cases, the TLS/SSL server 522 can send an optional message 526 with the server's certificate, server key exchange, and/or certificate request, to which the TLS/SSL server 522 can respond with a SERVER HELLO COMPLETE message 527. In the SEVER HELLO INIT message 525, the TLS/SSL server 522 can respond with integrity data to authenticate the integrity of itself and/or request for integrity data to authenticate the integrity of the TLS/SSL client 521.

In a CLIENT EXCHANGE phase 528, the TLS/SSL client 521 can send an optional CLIENT'S CERTIFICATE message 529 and/or a CLIENTKEYEXCHANGE message 530, depending on which algorithm was selected during the HELLO MESSAGE PHASE 523, and an optional CERTIFICATE VERIFY message 531. In some cases, this CLIENT'S CERTIFICATE message 529 is only sent if the TLS/SSL server 522 requests a certificate. If no suitable certificate is available, the TLS/SSL client 521 can send a certificate message containing no certificates. That is, the certificate_list structure has a length of zero. If the TLS/SSL client 521 does not send any certificates, the TLS/SSL server 522 may, at its discretion, either continue the handshake without client authentication, or respond with a fatal handshake_failure alert. Also, if some aspect of the certificate chain was unacceptable (e.g., it was not signed by a known, trusted Certificate Authority), the TLS/SSL server 522 may, at its discretion, either continue the handshake (considering the client unauthenticated) or send a fatal alert. In sending the CLIENT'S CERTIFICATE message 529, the TLS/SSL client 521 may include a request for integrity data to authenticate the integrity of the TLS/SSL server 522 or provide integrity data to authenticate the integrity of itself to the TLS/SSL server 522. Furthermore, the follow-up CLIENTKEYEXCHANGE message 530 is sent by the TLS/SSL client 521 after the CLIENT'S CERTIFICATE message 529, otherwise, it is the first message sent by the TLS/SSL client 521 after it receives the SERVER HELLO COMPLETE 527 message.

In order to begin connection protection, the TLS/SSL protocol requires specification of a suite of algorithms, a master secret, and the client and server random values. The authentication, encryption, and MAC algorithms are determined by a cipher_suite selected by the TLS/SSL server 522 and revealed in the SEVER HELLO INIT message 525. A compression algorithm is negotiated in the hello messages, and the random values are exchanged in the hello messages. All that remains is to calculate the master secret. The CLIENTKEYEXCHANGE message 530 sets a premaster secret either by direct transmission of a RSA-encrypted (for Rivest-Shamir-Adleman cryptography) secret or by the transmission of Diffie-Hellman parameters that will allow each side to agree upon the same premaster secret.

Then during a CIPHER CHANGE phase 532, the TLS/SSL client 521 may send a CHANGE CIPHERSPEC message 533 and a FINISH message 534, to which the TLS/SSL server 522 may respond with a CHANGE CIPHERSPEC message 535 and a FINISH message 536. Then the TLS/SSL client 521 and the TLS/SSL server 522 may establish encrypted data transfer 537.

The integrity data may be attached to any of the above TLS/SSL messages from either the TLS/SSL client 521 or a TLS/SSL server 522 to authenticate the integrity of the other at any point of the process of establishing and maintaining the encrypted network session. The integrity-related data that serves as integrity data may be aggregated into integrity data. Note that the above described roles could also be reversed. For example, the TLS/SSL server 522 may validate the integrity data of the TLS/SSL client 521 and decides on whether the TLS/SSL client 521 is allowed to connect to the network and proceed with authentication and/or continue to be connected to the network.

IPsec Tunnel Attestation

Figure 5C:
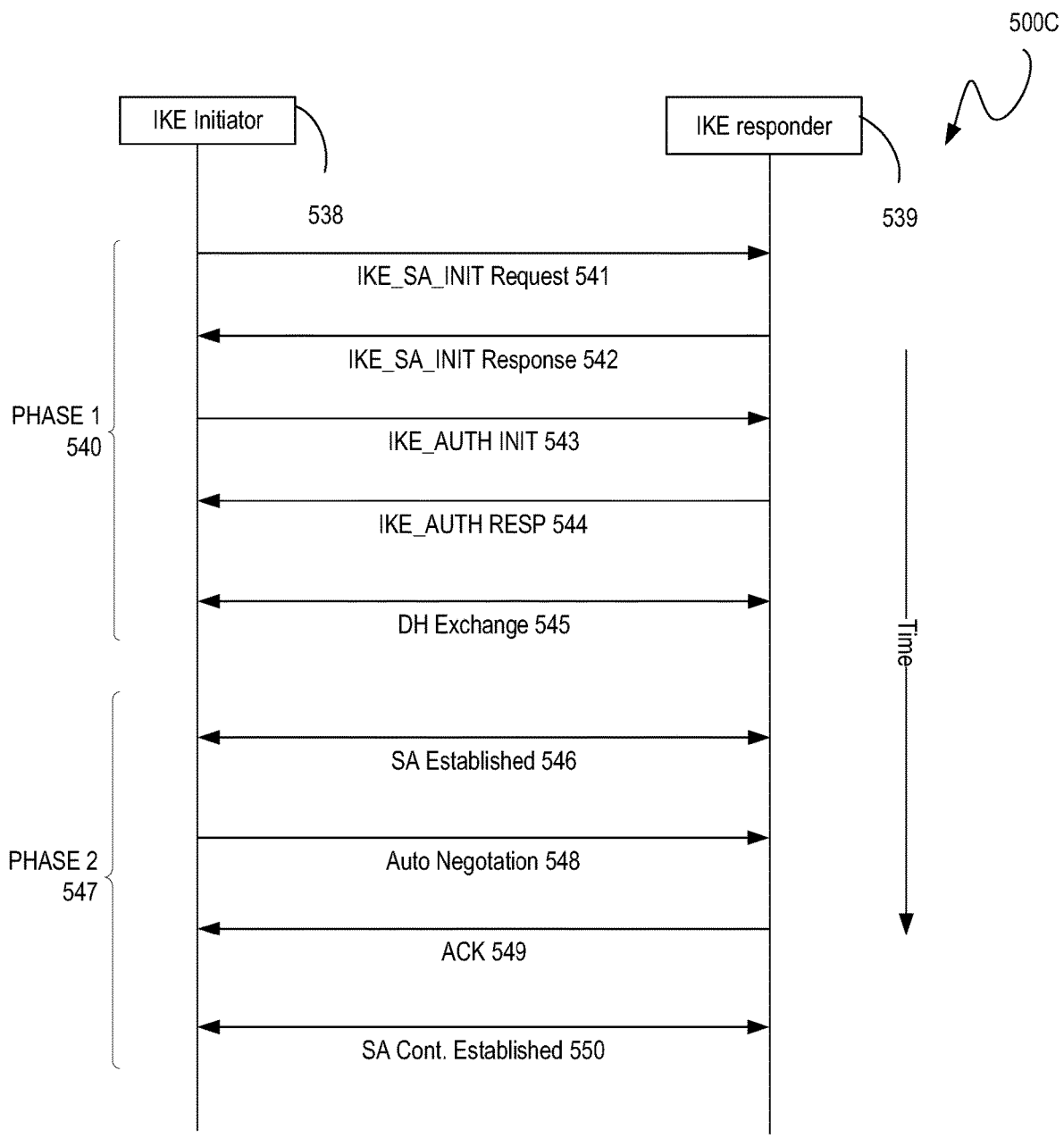
FIGS. 5C-5D illustrate example call flows for attestation between an Internet Protocol Security (IPsec) client and a IPsec server associated with establishing and/or maintaining a trustworthy encrypted network session in accordance with some examples.
Figure 5D:
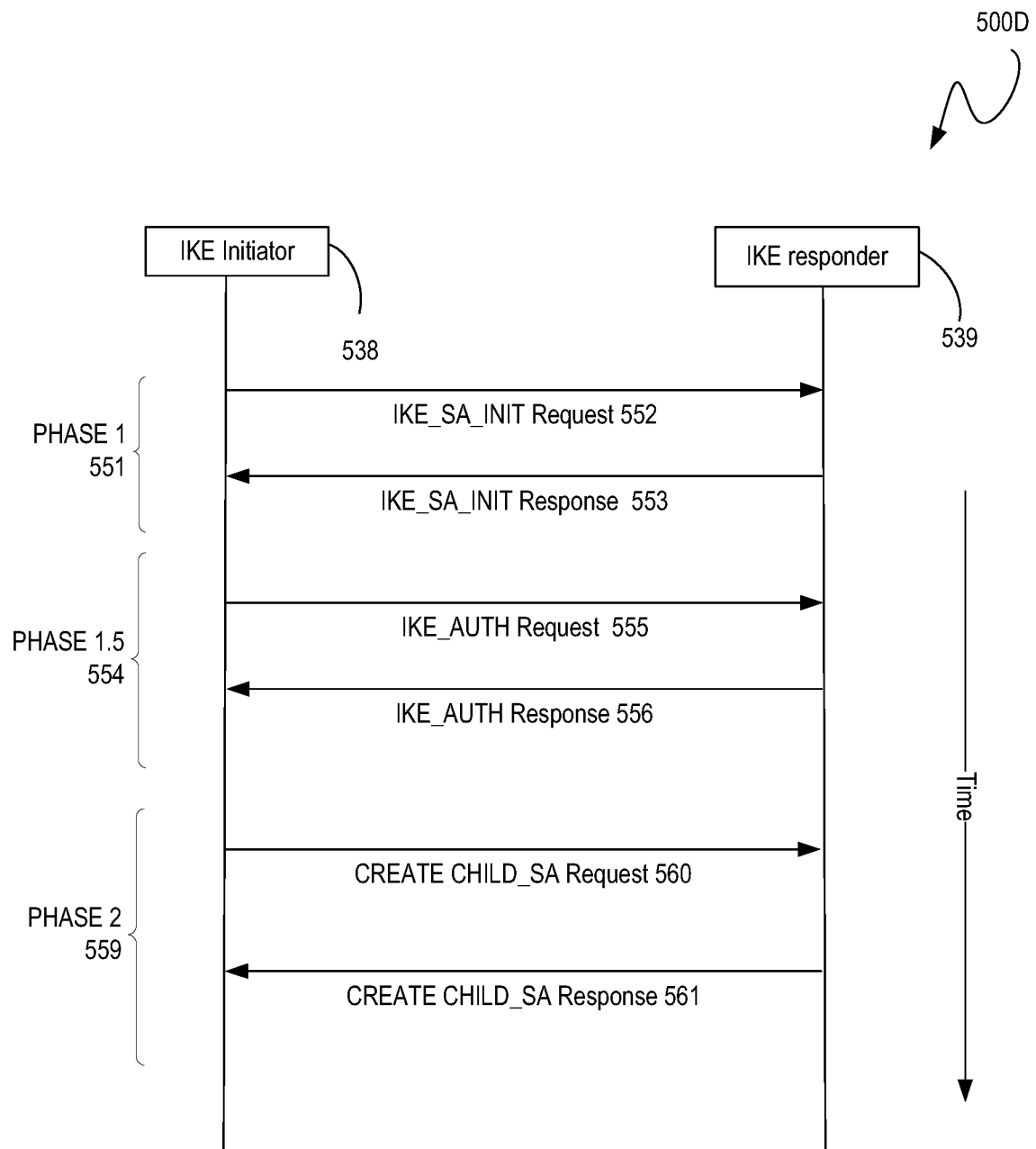

Attestation-based trust may also be established for IPsec tunnel connections for variety of applications/protocols. FIGS. 5C-5D are example call flows 500C, 500D for attestation between an IKE initiator 538 and an IKE responder 539 associated with establishing and maintaining a trustworthy encrypted network session using an IKE or IKEv2 mutual authentication method. In these examples, the IKE initiator 538 and the IKE responder 539 can represent any physical and/or virtual network or computing nodes, such as the source node 102 and the destination node 116 shown in FIGS. 1 through 3, with IKE capabilities.

For IPsec tunnel attestation, attestation of peers for trust evaluation may occur during a control plane setup or during an IPsec data plane packet exchange. For trust evaluation of peers during control plane setup, Internet Key Exchange (IKE and IKEv2) Protocol, referenced in Request for Comments (RFC) series at RFC2409 and RFC4306, respectively, may allow for mutual authentication between two parties and establishing a shared secret that is used to protect the traffic on a Virtual Private Network (VPN) tunnel. Integrity data can be added to the IKE messages as an extension. In some examples, IKE/IKEv2 can be extended with extensions as further defined in: https://tools.ietf.org/html/rfc4306 and https://tools.ietf.org/html/rfc2409, the contents of which are incorporated herein by reference in their entirety. An IKEv2 mutual authentication method can be extended with integrity data containing proof of integrity as listed above along with a proof of freshness of the integrity data. In some examples, attestation may be used with Online Certificate Status Protocol (OCSP) stapling, a standard for checking the revocation status of X.509 digital certificates, to reduce verification time.

The IKEv2 mutual authentication method may be accomplished by the IKE initiator 538 and IKE responder 539, wherein once a secure transport tunnel is established, the IKE initiator 538 and IKE responder 539 mutually authenticate and once the mutual authentication is confirmed, information may be exchanged. The IKEv2 mutual authentication method can include adding integrity data to the IKE messages as an extension that embeds a hardware fingerprint (e.g., derived from a SUDI certificate or the like), and/or integrity data. The IKE initiator 538 and IKE responder 539 may use information like a nonce in the packet and/or the integrity data to verify whether the other peer is trustworthy. If the verification is successful, then an IPsec session may be established.

In another example of IPsec tunnel attestation, trust evaluation of peers may occur during an IPSEC data plane packet exchange via an IPSec extension for attestation. The IKEv2 mutual authentication method may be accomplished by having a new attestation header or header field(s) to be chained with both an Authentication Header (AH) or Encapsulating Security Payload (ESP) using a "Next Header" field, such that the attestation header may be as shown in FIG. 6A.

There may be various options for chaining the attestation header in ESP. For example, the attestation header can be implemented via ESP-Payload data that is encrypted as exemplified in FIG. 6B. The integrity data may be encrypted so its integrity is maintained and safe from a man-in-middle attack. However, this is not mandatory as the integrity data itself could be signed and verified for integrity. Alternatively, the attestation header can be chained between an IPv4/IPv6 and ESP Header, as follows: IPv4→Attestation Header→ESP header→payload→ESP trailer→ESP Auth Data. This option may lead to a DOS attack and a man-in-middle can change this data so a receiver may end up discarding packets from valid verified peer or may lead to network alarms or policy enforcement-based actions.

In one variation, the attestation header can be kept in each IPsec payload and sent periodically for selected packets. Selection of the packets to add attestation header can be based on sample rate or size of the packet that can carry additional data. If present, the receiver can process and take action (e.g., as per a security policy) as to the attestation header. The Internet Key Exchange (IKE) may also be extended to negotiate a timer interval for the attestation header for IPsec security association (SA). IPsec can use IKE to negotiate a "shared secret" between two IPsec endpoints. IKE is flexible and can add a new characteristic(s) for the IPsec SA being negotiated and a time interval for the attestation header so both endpoints can communicate with each other and prove trustworthiness.

In another variation, IPSec packet processing happens at the data plane. A sender node can send integrity data with stapling (e.g., a time-stamped signature such as OCSP stapling), which can reduce the overhead of verification at the receiver and eliminate the need for the receiver to contact an external "verifier service". Also, the sender can prepare the attestation/integrity data with stapling ahead of packet forwarding and optimize processing time for adding the attestation header to the packets.

FIG. 5C illustrates an exemplary call flow 500c using an IKEv1 mutual authentication method. Generally in Phase 1 540, communication using IKE begins with IKE_SA_INIT and IKE_AUTH exchanges. The initial exchanges can include four messages, though in some scenarios that number can change/grow. Communications using IKE can include request/response pairs. The first pair of message in IKE_SA_INIT, IKE_SA_INIT Request 541 and IKE_SA_INIT Response 542, can negotiate cryptographic algorithms and exchange nonces. The second pair of messages, IKE_AUTH INIT 543 and IKE_AUTH RESP 544 authenticate the previous messages, exchange identities and certificates. The IKE initiator 538 and the IKE responder 539 then perform a Diffie-Hellman (DH) exchange 545, wherein cryptographic keys are security exchanged, and establish an IKE Security Association (SA) 546 which beings Phase 2 547.

In Phase 2 547, with the IKE SA Established 546, the SA is configured to auto-renegotiate 548 after set durations, with an optional replay detection available for detecting replay attacks that occur when an unauthorized party intercepts a series of IPsec packets and replays them back into the tunnel. The auto-renegotiation 548 may also have Perfect Forward Secrecy (PFS) enabled for improving security by forcing a new DH exchange whenever a key's life expires. The acknowledgement (ACK) 549 can be in response to any the auto-renegotiation 548 to allow the SA Cont. Established 550. In any of these messages in both Phase 1 540 and Phase 2 547, the IKE initiator 538 and/or IKE responder 539 can request for integrity data to authenticate the integrity of its peer or send integrity data to authenticate the integrity of itself by extending the messages sent to one another with a request for integrity data or integrity data itself.

With reference to FIG. 5D, following an IKEv2 protocol, the IKE initiator 538 and the IKE responder 539 can send messages to one another. In a PHASE 1 551, the IKE initiator 538 may send a IKE_SA_INIT request 552, to which the IKE responder 539 may send a IKE_SA_INIT response 553 which secures the channel such that all following transactions are encrypted. Unlike IKEv1, in an IKEv2 proposal, multiple algorithms and modulus groups from which peers can choose during the Phase 1 negotiation may be selected, potentially making it possible to create a single IKE proposal. After the initial exchange is completed, all further exchanges are encrypted. The IKE_SA_INIT exchanges contain only two packets because it combines all the information usually exchanged in MM1-4 in IKEv1. The IKE initiator 538 and/or IKE responder 539 can request for integrity data to authenticate the integrity of its peer or send integrity data to authenticate the integrity of itself by extending the IKE_SA_INIT messages sent to one another with a request for integrity data or integrity data itself.

After the IKE_SA_INIT exchange is complete, the IKEv2 SA is encrypted; however, the remote peer has not been authenticated. The IKE_AUTH exchange is used to authenticate the remote peer and create the first IPsec SA. In Phase 1.5 554 for authentication, the IKE initiator 538 may then send an IKE_AUTH request 555, to which the IKE responder 539 may send an IKE_AUTH response 556. These request/response message pairs may send authentication payloads and Internet Security Association and Key Management Protocol (ISAKMP) identifier and use various authentication methods by using key exchanged algorithms is as Rivest, Shamir, and Adelman (RSA), a pre-shared key (PSK), Elliptic Curve Digital Signature Algorithm (ECDSA), or Extensible Authentication Protocol (EAP) in the exchanged packets to authenticate such that both the IKE initiator 538 and the IKE responder 539 are ready to encrypt traffic. In addition to the authentication payloads, the exchange includes the SA and Traffic Selector payloads that describe the IPsec SA to be created.

If additional child SAs are required, or if the IKE SA or one of the child SAs needs to be re-keyed, it serves the same function as Phase 2 547 in IKEv1. As shown in FIG. 5D, there are two packets in this exchange; however, the exchange repeats for every rekey or new SA: In Phase 2 559, the IKE initiator 538 may then send a CREAT CHILD_SA request 560, to which the IKE responder 539 may send a CREAT CHILD_SA response 561. Again, the integrity data may be attached to any IKE message from either the IKE initiator 538 or the IKE responder 539 to authenticate the integrity of the other at any point of the process of establishing and/or maintaining the encrypted network session.

As mentioned above, FIG. 6A illustrates an example attestation header for an IPSec extension for attestation in accordance with some examples. For an IPSec data plane packet exchange, traffic going through the tunnel can be sent as Authentication Header (AH) or Encapsulating Security Payload (ESP) packets. By using "Next Header" as shown in FIG. 6A, a new "attestation header" is added into the exchange and changed with both AH or ESP packets. For ESP-payload data, which is encrypted, attestation data is encrypted so its integrity is maintained and safe from any man-in-middle attacks. In addition, the attestation data itself can be signed and verifiable for integrity, which can add another layer of security with respect to the integrity of the data. For example, the new "attestation header" or "Next Header" can be chained within the ESP packet as shown in FIG. 6B.

Figure 7A:
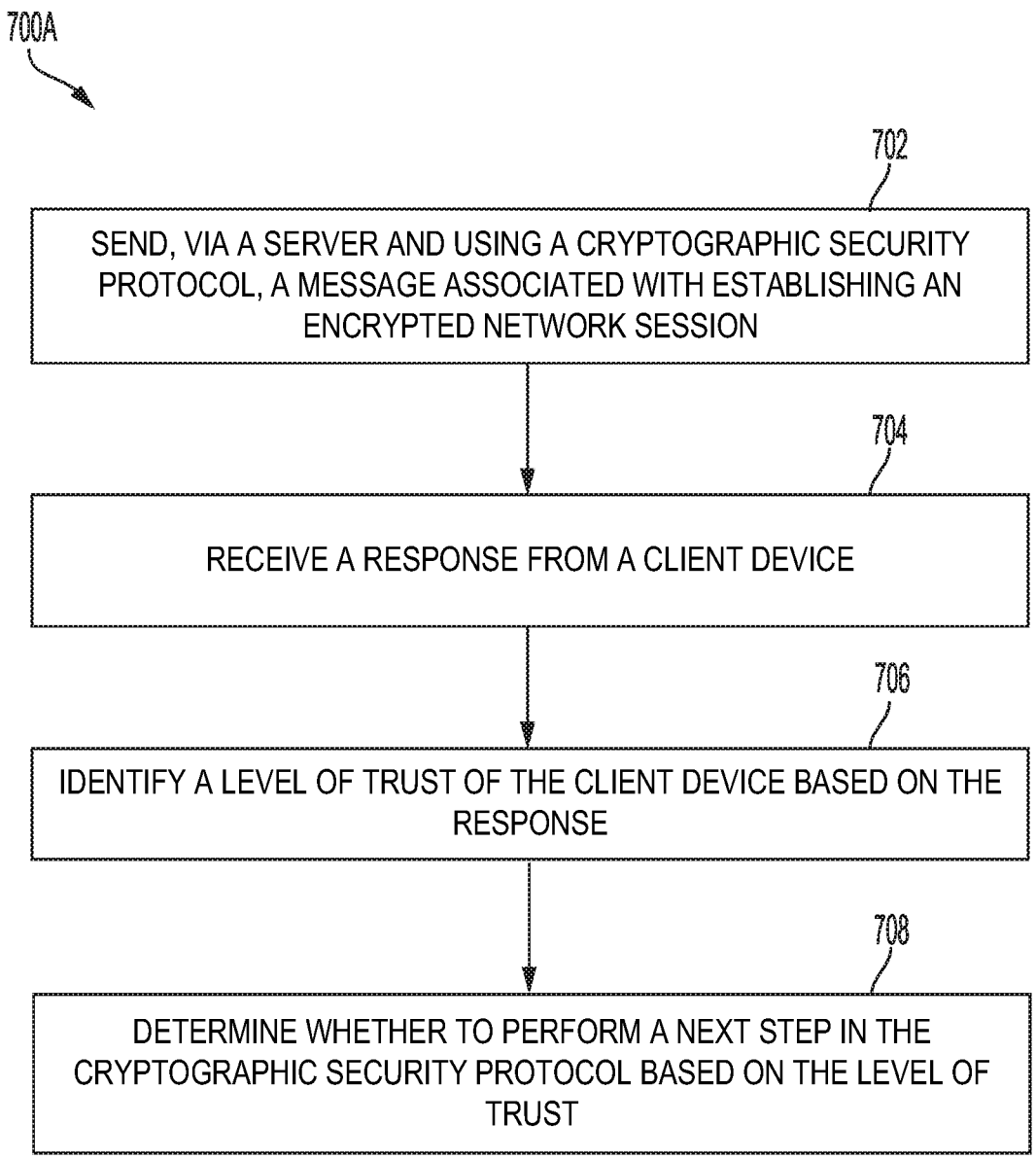
FIGS. 7A-7B illustrate example methods for attestation in forming or maintaining a trustworthy encrypted network session, in accordance with some examples.

FIG. 7A is an example method 700A for establishing and/or maintaining trustworthy encrypted network sessions in accordance with some implementations. A server can send (702) a message associated with establishing an encrypted network session and using a cryptographic security protocol to send the message. The cryptographic security protocol can be any cryptographic security protocol such as, for example, Secure Shell (SSH) protocol, Transport Layer Security (TLS) protocol, Secure Sockets Layer (SSL) protocol, and Internet Protocol Security (IPsec) protocol. As described above, these protocols can require different messages to be sent between the server and the client device. Generally, the server can receive (704) a response from a responding client device. The response can include an answer from the client device. The response can include metadata about the client device's proof of integrity provided by a trusted platform module crypto-processor based on an evaluation of the response, with respect to the identity of hardware and software components of the responding client device.

The response can be evaluated based on logs maintained in a trusted storage of the client device. In some examples, the logs can indicate a set of transactions that have occurred since a boot time of the client device and can provide data regarding the client device's trustworthiness. The response can include a proof of freshness based on signed data generated within a threshold period of time and can include a current time when the response is sent.

In some examples, the message can include a challenge to the freshness of any response. The challenge can include a nonce that is passed through a trusted platform module crypto-processor associated with the client device to generate a signature based on the nonce. The response can include such signature. The response can include a proof of freshness based on a token, and the server can validate the token with respect to the proof of freshness based on a state of internal counters within a trusted platform module crypto-processor associated with the client device. In some examples, the server can host a directory of reference integrity values, known good reference values, and/or public keys published as certificates of other peer devices for validating the tokens.

In some cases, the response can include integrity data including information about secure boots, logs on software changes made on the client device, software-version checksums for one or more processes, proof that the client device supports trusted storage for received data, or an integrity of one or more hardware components. At least part of the integrity data can be continuously provided by the server while the encrypted network session is periodically alive, persistently alive, alive on demand, or alive on event. Moreover, the encrypted network session can be terminated when the server fails to provide the integrity data or the level of trust fails to indicate trustworthiness.

Based on the response, the server can identify (706) a level of trust of the responding client device based on the response. For example, the server can analyze the integrity data in the response to verify that the integrity data is fresh, any signatures in the integrity data are valid, and/or any measurements/information in the integrity data, such as any measurements/information about a boot process/environment of the client device, running processes and/or software on the client device, changes to software and/or data on the client device, a state/change of any hardware or firmware on the client device, etc., indicate that the client device is trustworthy and/or has not been compromised. The server can then determine (708) whether to perform a next step in the cryptographic security protocol based on the level of trust. For example, the next step can include establishing an encrypted network session, denying an attempt/request to establish the encrypted network session, etc.

Figure 7B:
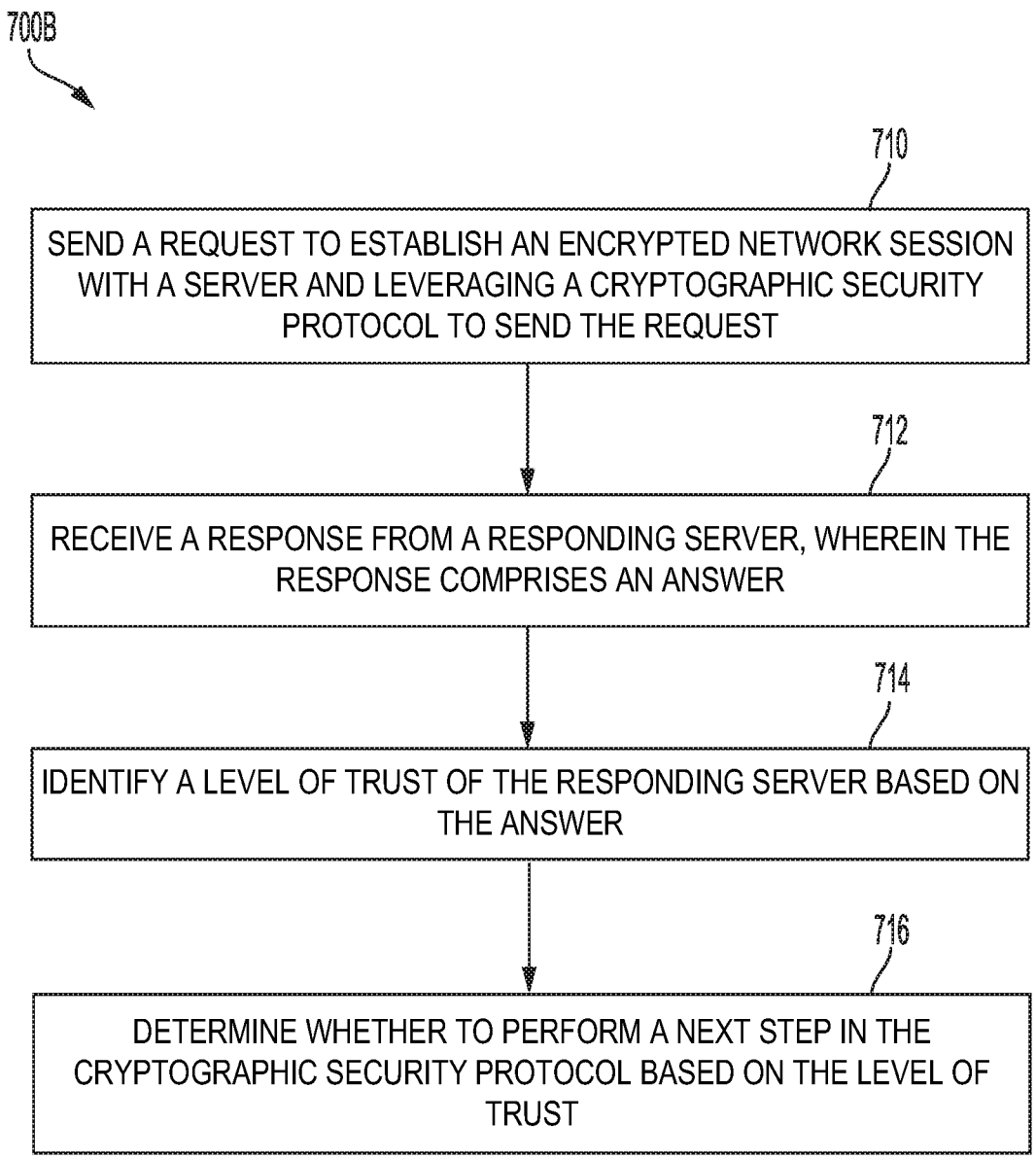

FIG. 7B is another example method 700B for establishing and/or maintaining trustworthy encrypted network sessions in accordance with some implementations. The method can include sending (710) a request to establish an encrypted network session with a server and leveraging a cryptographic security protocol to send the request and receive (712) a response from a responding server, wherein the response comprises an answer.

As for the request, it can include a challenge to the freshness of any response and the challenge can include a nonce that is passed through a trusted platform module crypto-processor associated with the network device to generate a signature based on the nonce. In some examples, the response can include the signature. The response can also include a proof of freshness based on a token. The server can validate the token with respect to the proof of freshness based on a state of internal counters within a trusted platform module crypto-processor associated with the network device. In some cases, the server can host a directory of reference integrity values, known good reference values, and/or public keys published as certificates of other peer devices for validating the tokens. At least part of the integrity data can be continuously provided by the server while the encrypted network session is periodically alive, persistently alive, alive on demand, or alive on event. In some cases, the encrypted network session can be terminated when the server fails to provide the integrity data or the level of trust fails to indicate trustworthiness.

Then based on the response, a level of trust of the responding server may be identified (714) and a determination is made (716) regarding whether to perform a next step in the cryptographic security protocol based on the level of trust. Non-limiting examples of cryptographic security protocols can include Transport Layer Security (TLS), Secure Sockets Layer (SSL), Secure Shell (SSH), and Internet Protocol Security (IPsec).

The disclosure now turns to FIGS. 8 and 9, which illustrate example network nodes and computing devices, such as switches, routers, client devices, endpoints, servers, and so forth.

FIG. 8 illustrates an example network device 800 suitable for performing switching, routing, and other networking operations. Network device 800 includes a central processing unit (CPU) 804, interfaces 802, and a connection 810 (e.g., a PCI bus). When acting under the control of appropriate software or firmware, the CPU 804 is responsible for executing packet management, error detection, and/or routing functions. The CPU 804 can accomplish these functions under the control of software including an operating system and any appropriate applications software. CPU 804 may include one or more processors 808, such as a processor from the INTEL X98 family of microprocessors. In some cases, processor 808 can be specially designed hardware for controlling the operations of network device 800. In some cases, a memory 806 (e.g., non-volatile RAM, ROM, etc.) also forms part of CPU 804. However, there are many different ways to which memory could be coupled to the system.

The interfaces 802 are typically provided as modular interface cards (sometimes referred to as "line cards"). Generally, they control the sending and receiving of data packets over the network and sometimes support other peripherals used with the network device 800. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the CPU 804 to efficiently perform routing computations, network diagnostics, security functions, etc.

Although the system shown in FIG. 8 is one specific network device of the present technologies, it is by no means the only network device architecture on which the present technologies can be implemented. For example, an architecture having a single processor that handles communications as well as routing computations, etc., is often used. Further, other types of interfaces and media could also be used with the network device 800.

Regardless of the network device's configuration, it may employ one or more memories or memory modules (including memory 806) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 806 could also hold various software containers and virtualized execution environments and data.

The network device 800 can also include an application-specific integrated circuit (ASIC) 812, which can be configured to perform routing and/or switching operations. The ASIC 812 can communicate with other components in the network device 800 via the connection 810, to exchange data and signals and coordinate various types of operations by the network device 800, such as routing, switching, and/or data storage operations, for example.

FIG. 9 illustrates a computing system architecture 900 including various components in electrical communication with each other using a connection 906, such as a bus. Example system architecture 900 includes a processing unit (CPU or processor) 904 and a system connection 906 that couples various system components including the system memory 920, such as read only memory (ROM) 918 and random access memory (RAM) 916, to the processor 904. The system architecture 900 can include a cache 902 of high-speed memory connected directly with, in close proximity to, or integrated as part of the processor 904. The system architecture 900 can copy data from the memory 920 and/or the storage device 908 to the cache 902 for quick access by the processor 904. In this way, the cache can provide a performance boost that avoids processor 904 delays while waiting for data. These and other modules can control or be configured to control the processor 904 to perform various actions.

Other system memory 920 may be available for use as well. The memory 920 can include multiple different types of memory with different performance characteristics. The processor 904 can include any general purpose processor and a hardware or software service, such as service 1 910, service 2 912, and service 3 914 stored in storage device 908, configured to control the processor 904 as well as a special-purpose processor where software instructions are incorporated into the actual processor design. The processor 904 may be a completely self-contained computing system, containing multiple cores or processors, a bus, memory controller, cache, etc. A multi-core processor may be symmetric or asymmetric.

To enable user interaction with the computing system architecture 900, an input device 922 can represent any number of input mechanisms, such as a microphone for speech, a touch-sensitive screen for gesture or graphical input, keyboard, mouse, motion input, speech and so forth. An output device 924 can also be one or more of a number of output mechanisms known to those of skill in the art. In some instances, multimodal systems can enable a user to provide multiple types of input to communicate with the computing system architecture 900. The communications interface 926 can generally govern and manage the user input and system output. There is no restriction on operating on any particular hardware arrangement and therefore the basic features here may easily be substituted for improved hardware or firmware arrangements as they are developed.

Storage device 908 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 916, read only memory (ROM) 918, and hybrids thereof.

The storage device 908 can include services 910, 912, 914 for controlling the processor 904. Other hardware or software modules are contemplated. The storage device 908 can be connected to the system connection 906. In one aspect, a hardware module that performs a particular function can include the software component stored in a computer-readable medium in connection with the necessary hardware components, such as the processor 904, connection 906, output device 924, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language or other language reciting "at least one of" a set or "one or more of" a set" indicates that one member of the set or multiple members of the set (in any combination) satisfy the claim. For example, claim language reciting "at least one of A and B" means A, B, or A and B. In another example, claim language reciting "one or more of A and B" means A, B, or A and B. In another example, claim language reciting "one or more of A, B, and C" means A, B, C, A and B, A and C, B and C, or all of A, B, and C.

What is claimed is:

1. A computer-implemented method, comprising:
   sending, via a server and using a cryptographic security protocol, a message associated with establishing an encrypted network session;
   receiving one or more responses from a set of client devices, the one or more responses comprising random numbers, each response containing one or more random numbers from a perspective of the server, wherein the one or more random numbers form a set of random numbers, wherein the set of random numbers is algorithmically combined into a single nonce, wherein the single nonce is passed through a crypto-processor to generate a signature which at least includes the single nonce and information from the crypto-processor which allows a determination of a level of trust of the set of client devices, wherein the information from the crypto-processor comprises integrity data associated with the set of client devices, the integrity data comprising at least one of information about a secure boot, a log of software changes made on the set of client devices, one or more software-version checksums for one or more processes, proof that the set of client devices supports trusted storage for received data, and an integrity of one or more hardware components;
   identifying a level of trust of each of the set of client devices based on the one or more responses; and
   determining whether to perform a next step in the cryptographic security protocol based on the level of trust, wherein the cryptographic security protocol comprises at least one of a Secure Shell (SSH) protocol, a Transport Layer Security (TLS) protocol, a Secure Sockets Layer (SSL) protocol, and an Internet Protocol Security (IPsec) protocol.

2. The computer-implemented method of claim 1, wherein the integrity data in the one or more responses comprises metadata about a proof of integrity of the set of client devices provided by one or more trusted platform module crypto-processors based on an evaluation of the one or more responses, with respect to an identity of hardware and software components of the set of client devices.

3. The computer-implemented method of claim 2, wherein the one or more responses are evaluated based on logs maintained in a trusted storage of one or more of the set of client devices, wherein the logs indicate a set of transactions that have occurred since a boot time of the set of client devices and provides data regarding trustworthiness of the set of client devices.

4. The computer-implemented method of claim 1, wherein at least one of the integrity data and the one or more responses comprise a proof of freshness based on signed data generated within a threshold period of time including a current time when the one or more responses were sent.

5. The computer-implemented method of claim 4, wherein the message comprises a challenge to a freshness of any response, the challenge comprising a nonce that is passed through a trusted platform module crypto-processor associated with one or more of the set of client devices to generate one or more signatures based on the nonce.

6. The computer-implemented method of claim 1, wherein at least one of the integrity data and the one or more responses comprise at least one of a proof of freshness based on a token and an identity of hardware and software components of the set of client devices.

7. The computer-implemented method of claim 6, wherein the server validates the token with respect to the proof of freshness based on a state of internal counters within one or more trusted platform module crypto-processors associated with the set of client devices, and wherein the server hosts a directory of reference integrity values, known good reference values, and public keys published as certificates of other peer devices for validating tokens.

8. The computer-implemented method of claim 1, wherein at least part of the integrity data is continuously provided by the server while the encrypted network session is periodically alive, persistently alive, alive on demand, or alive on event.

9. The computer-implemented method of claim 8, wherein the encrypted network session is terminated when the server fails to provide the integrity data or the level of trust fails to indicate trustworthiness.

10. The computer-implemented method of claim 1, wherein the set of random numbers is combined algorithmically into the single nonce using a Bloom filter.

11. A non-transitory computer-readable storage medium storing instructions that, when executed by one or more processors, cause the one or more processors to:
send, via a server and using a cryptographic security protocol, a message associated with establishing an encrypted network session;
receive one or more responses from a set of client devices, the one or more responses comprising random numbers, each response containing one or more random numbers from a perspective of the server, wherein the one or more random numbers form a set of random numbers, wherein the set of random numbers is algorithmically combined into a single nonce, wherein the single nonce is passed through a crypto-processor to generate a signature which at least includes the single nonce and information from the crypto-processor which allows a determination of a level of trust of the set of client devices, wherein the information from the crypto-processor comprises integrity data associated with the set of client devices, the integrity data comprising at least one of information about a secure boot, a log of software changes made on the set of client devices, one or more software-version checksums for one or more processes, proof that the set of client devices supports trusted storage for received data, and an integrity of one or more hardware components;
identify a level of trust of each of the set of client devices based on the one or more responses; and
determine whether to perform a next step in the cryptographic security protocol based on the level of trust.

12. The non-transitory computer-readable storage medium of claim 11, wherein at least one of the integrity data and the one or more responses comprises metadata about a proof of integrity of the set of client devices provided by one or more trusted platform module crypto-processors based on an evaluation of the one or more responses, with respect to an identity of hardware and software components of the set of client devices.

13. The non-transitory computer-readable storage medium of claim 12, wherein the one or more responses are evaluated based on logs maintained in a trusted storage of one or more of the set of client devices, wherein the logs indicate a set of transactions that have occurred since a boot time of the set of client devices and provides data regarding trustworthiness of the set of client devices.

14. The non-transitory computer-readable storage medium of claim 11, wherein at least one of the integrity data and the one or more responses comprises a proof of freshness based on signed data generated within a threshold period of time including a current time when the one or more responses were sent.

15. The non-transitory computer-readable storage medium of claim 14, wherein the message comprises a challenge to a freshness of any response, the challenge comprising a nonce that is passed through a trusted platform module crypto-processor associated with one or more of the set of client devices to generate one or more signatures based on the nonce.

16. The non-transitory computer-readable storage medium of claim 11, wherein the cryptographic security protocol is selected from a group consisting of Transport Layer Security (TLS), Secure Sockets Layer (SSL), Secure Shell (SSH), and Internet Protocol Security (IPsec).

17. A system, comprising:
one or more processors; and
memory including instructions that, when executed by the one or more processors, cause the one or more processors to:
send, via a server and using a cryptographic security protocol, a message associated with establishing an encrypted network session;
receive one or more responses from a set of client devices, the one or more responses comprising random numbers, each response containing one or more random numbers from a perspective of the server, wherein the one or more random numbers form a set of random numbers, wherein the set of random numbers is algorithmically combined into a single nonce, wherein the single nonce is passed through a crypto-processor to generate a signature which at least includes the single nonce and information from the crypto-processor which allows a determination of a level of trust of the set of client devices, wherein the information from the crypto-processor comprises integrity data associated with the set of client devices, the integrity data comprising at least one of information about a secure boot, a log of software changes made on the set of client devices, one or more software-version checksums for one or more processes, proof that the set of client devices supports trusted storage for received data, and an integrity of one or more hardware components;
identify a level of trust of each of the set of client devices based on the one or more responses; and
determine whether to perform a next step in the cryptographic security protocol based on the level of trust, wherein the cryptographic security protocol comprises at least one of Transport Layer Security (TLS), Secure Sockets Layer (SSL), Secure Shell (SSH), and Internet Protocol Security (IPsec).

18. The system of claim 17, wherein at least one of the integrity data and the one or more responses comprises at least one of a proof of freshness based on a token and an identity of hardware and software components of the set of client devices.

19. The system of claim 18, wherein the server validates the token with respect to the proof of freshness based on a state of internal counters within one or more trusted platform module crypto-processors associated with the set of client devices, and wherein the server hosts a directory of reference integrity values, known good reference values, and public keys published as certificates of other peer devices for validating tokens.

20. The system of claim 17, wherein at least part of the integrity data is continuously provided by the server while the encrypted network session is periodically alive, persistently alive, alive on demand, or alive on event, and wherein the encrypted network session is terminated when the server fails to provide the integrity data or the level of trust fails to indicate trustworthiness.

* * * * *